US011072067B2

(12) United States Patent
Bergstra

(10) Patent No.: US 11,072,067 B2
(45) Date of Patent: Jul. 27, 2021

(54) SYSTEMS, DEVICES, AND METHODS FOR DISTRIBUTED ARTIFICIAL NEURAL NETWORK COMPUTATION

(71) Applicant: Kindred Systems Inc., Vancouver (CA)

(72) Inventor: James Sterling Bergstra, Toronto (CA)

(73) Assignee: KINDRED SYSTEMS INC., San Francisco, CA (US)

(*) Notice: Subject to any disclaimer, the term of this patent is extended or adjusted under 35 U.S.C. 154(b) by 773 days.

(21) Appl. No.: 15/353,492

(22) Filed: Nov. 16, 2016

(65) Prior Publication Data

US 2017/0140259 A1 May 18, 2017

Related U.S. Application Data

(60) Provisional application No. 62/255,899, filed on Nov. 16, 2015.

(51) Int. Cl.
*B25J 9/16* (2006.01)
*G06N 3/08* (2006.01)
*G06N 3/04* (2006.01)

(52) U.S. Cl.
CPC ............ *B25J 9/161* (2013.01); *G06N 3/0445* (2013.01); *G06N 3/084* (2013.01); *G05B 2219/33025* (2013.01); *G05B 2219/33027* (2013.01); *Y10S 901/01* (2013.01); *Y10S 901/02* (2013.01)

(58) Field of Classification Search
CPC ....... B25J 9/161; G06N 3/0445; G06N 3/084; G05B 2219/33025; G05B 2219/33027
See application file for complete search history.

(56) References Cited

U.S. PATENT DOCUMENTS 5,566,275 A * 10/1996 Kano ....................... B25J 9/161
382/153
5,673,367 A * 9/1997 Buckley ................. B25J 9/1612
706/23
9,489,623 B1 * 11/2016 Sinyavskiy ............. G06N 3/084
(Continued)

OTHER PUBLICATIONS

W. Thomas Miller III, "Real-Time Application of Neural Networks for Sensor-Based Control of Robots with Vision", IEEE, Jul./Aug. 1989. (Year: 1989).*

(Continued)

*Primary Examiner* — Alexey Shmatov
*Assistant Examiner* — Beatriz Ramirez Bravo
(74) *Attorney, Agent, or Firm* — Seed IP Law Group LLP

(57) ABSTRACT

Robots and robotic systems and methods can employ artificial neural networks (ANNs) to significantly improve performance. The ANNs can operate alternatingly in forward and backward directions in interleaved fashion. The ANNs can employ visible units and hidden units. Various objective functions can be optimized. Robots and robotic systems and methods can execute applications including a plurality of agents in a distributed system, for instance with a number of hosts executing respective agents, at least some of the agents in communications with one another. The hosts can execute agents in response to occurrence of defined events or trigger expressions, and can operate with a maximum latency guarantee and/or data quality guarantee.

18 Claims, 16 Drawing Sheets

(56) References Cited

U.S. PATENT DOCUMENTS

| | | | |
|---|---|---|---|
| 2004/0162638 A1* | 8/2004 | Solomon | F41H 13/00 700/247 |
| 2011/0029128 A1* | 2/2011 | Serre | B25J 9/161 700/245 |
| 2013/0054021 A1* | 2/2013 | Murai | G06N 3/008 700/245 |
| 2013/0166621 A1* | 6/2013 | Zhu | H04L 67/12 709/201 |
| 2014/0371907 A1* | 12/2014 | Passot | G06N 3/008 700/257 |
| 2015/0193695 A1* | 7/2015 | Cruz Mota | G06N 3/08 706/12 |
| 2015/0242747 A1* | 8/2015 | Packes | G06N 3/0454 706/17 |
| 2016/0375592 A1* | 12/2016 | Szatmary | B25J 11/0085 700/255 |
| 2017/0147722 A1* | 5/2017 | Greenwood | G06F 17/00 |

OTHER PUBLICATIONS

R. Rojas, Neural Networks, Chapter 7—The Backpropagation Algorithm, Sringer-Verlag, Berlin, 1996. (Year: 1996).*

Fulya Altiparmak et al., "Buffer allocation and performance modeling in asynchronous assembly system operations: An artificial neural network metamodeling approach", Elsevier, 2006. (Year: 2006).*

Campolucci et al., "On-line Learning Algorithms for Locally Recurrent Neural Networks", IEEE Transactions on Neural Networks, (1999). (Year: 1999).*

Maclaurin et al., "Gradient-based Hyperparameter Optimization through Reversible Learning", Proceedings of the 32nd International Conference on Machine Learning, Lille, France, (Jun. 2015). (Year: 2015).*

* cited by examiner

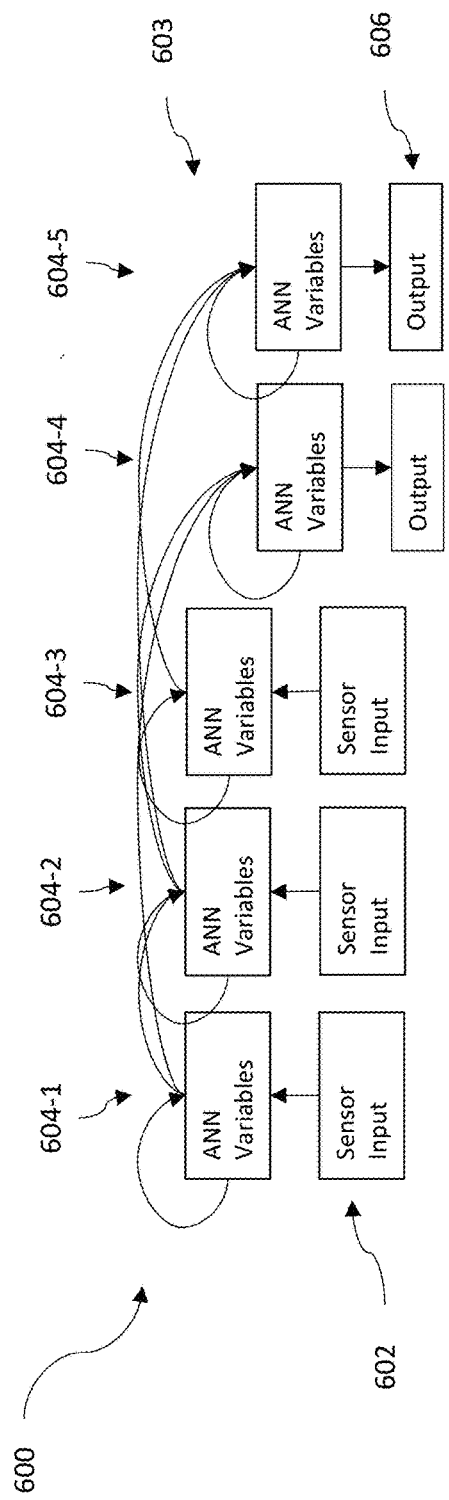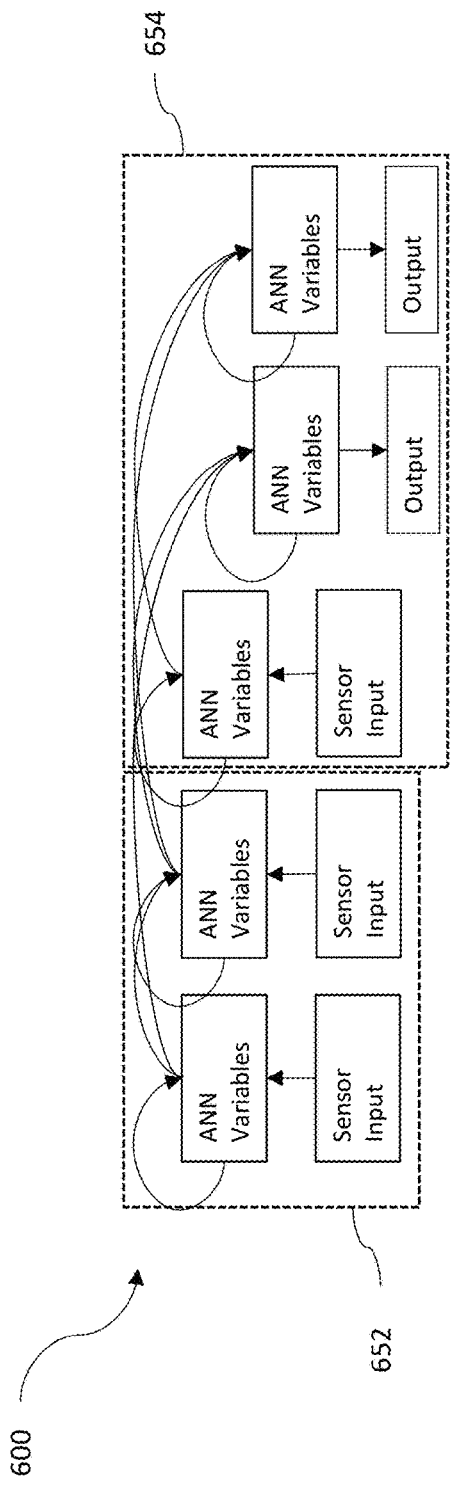
Fig. 6A
Fig. 6B

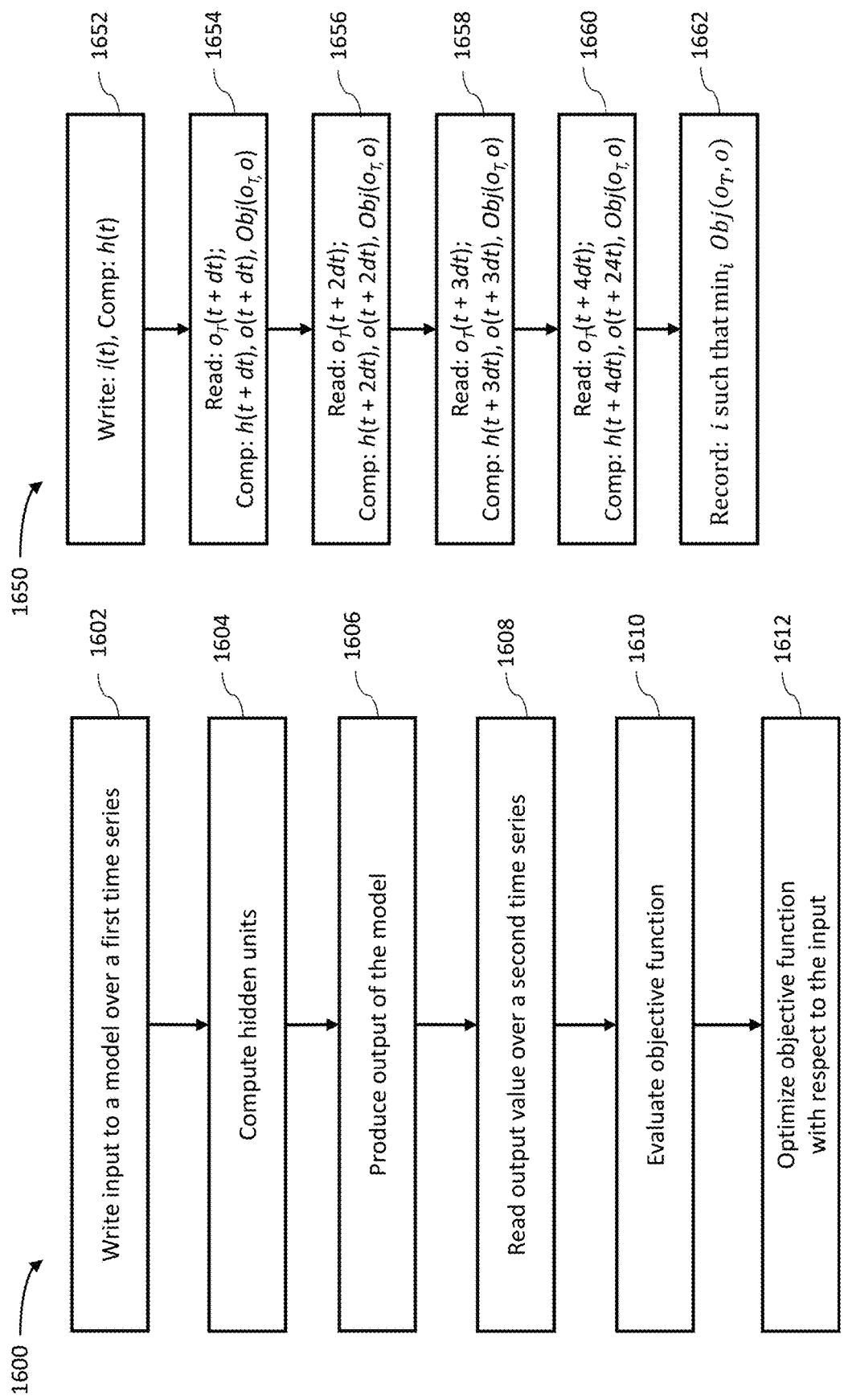

SYSTEMS, DEVICES, AND METHODS FOR DISTRIBUTED ARTIFICIAL NEURAL NETWORK COMPUTATION

BACKGROUND

Technical Field

This disclosure generally relates to the field of artificial neural networks including artificial neural networks used in distributed computing and/or associated with operation of robotics.

Description of the Related Art

Machine Learning

A computer, which is a machine, can perform or succeed at one more related tasks as defined by a measure. The computer learns if after exposure to information characterizing an event the computer improves under the measure at performing the one or more related tasks. Further, the computer learns without updates to any processor-executable instructions by imperative programming.

Artificial Neural Networks

Artificial neural networks (ANNs) are a family of machine learning models inspired by biological neural networks. The models include methods for learning and associated networks. A network includes units connected by links and is similar to a graph with units in place of nodes and weighted edges in place of unweighted edges. A unit has a non-linear response to an aggregate value for a set of inputs. The inputs are the responses of other units as mediated by weighted edges and/or a reference or bias unit. Traditionally and to an immaterial scaling factor a unit has as its state, a value between and including minus one and one, or zero and one. The term unit distinguishes artificial neural networks from biological neural networks where neurons is a term of art. These ANN are simulated using techniques from technical fields including computing, applied statistics, and signal processing. The simulation causes an ANN to learn over input, or apply the learning. That is, the simulation effects an evolution or adaptation of weights for the units and edges. These weights, also called parameters, are used in later computing including when simulating the ANNs' response to inputs. Both learning and application of learning of ANN require computational resources of at least time and processor-readable storage media space. There are many technical problems which prevent various systems, devices, articles, and methods from operating ANN with reduced resources.

BRIEF SUMMARY

A computing system including back propagation substantially as described and illustrated herein.

A system including a computer and a robot substantially as described and illustrated herein.

A robotic apparatus substantially as described and illustrated herein.

A method of operation of a computing system substantially as described and illustrated herein.

A method of operation of an artificial neural network, including a plurality of variables and a plurality of parameters, may be summarized as including computing, by at least one hardware processor, a first plurality of values for the plurality of variables in the artificial neural network based on a first plurality of values for the plurality of parameters over a first period; calculating, by the at least one hardware processor, a first plurality of incremental errors for the artificial neural network over the first period; generating, by the at least one hardware processor, a second plurality of values for the plurality of parameters; storing, by the at least one hardware processor, the second plurality of values for the plurality of parameters; interleaved with calculating the first plurality of incremental errors for the artificial neural network over the first period, computing, over a second period, by the at least one hardware processor, a second plurality of values for the plurality of variables for the artificial neural network based on the first plurality of values for the plurality of parameters; and returning, by the at least one hardware processor, the second plurality of values for the plurality of parameters.

The method may further include computing, by the at least one hardware processor, over a third period, a third plurality of values for the plurality of variables in the artificial neural network based on the second plurality of values for the plurality of parameters; calculating, by the at least one hardware processor, a second plurality of incremental errors for the artificial neural network over the third period; generating, by the at least one hardware processor, a third plurality of values for the plurality of parameters; and interleaved with calculating the second plurality of incremental errors for the artificial neural network over the third period, computing, by the at least one hardware processor, over a fourth period, a fourth plurality of values for the plurality of variables for the artificial neural network based on the second plurality of values for the plurality of parameters.

The method may further include storing, by the at least one hardware processor, the first plurality of values for the plurality of variables for the artificial neural network.

The artificial neural network may be associated with an objective function, the method further including computing, by the at least one hardware processor, a gradient for the objective function with respect to the plurality of parameters; and performing, by the at least one hardware processor, gradient descent with the gradient to create the second plurality of values for the plurality of parameters. Computing the plurality of gradients for the objective function with respect to the parameters may include unfolding, by the at least one hardware processor, the artificial neural network over a duration less than or equal to the first period; and performing, by the at least one hardware processor, back-propagation through time on the unfolded artificial neural network.

The method may further include receiving, by the at least one hardware processor, a plurality of input values for the artificial neural network.

The method may further include producing, by the at least one hardware processor, a plurality of output values for the artificial neural network; and causing, by the at least one hardware processor, a robot to move based on the plurality of output values.

The method may further include computing, by the at least one hardware processor for another artificial neural network that includes another plurality of variables and another plurality of parameters, a first plurality of values for the other plurality of variables of the other artificial neural network based on a first plurality of values for the other plurality of parameters; running, by the at least one hardware processor, the other artificial neural network backward over the first period; generating, by the at least one hardware processor, a second plurality of values for the other plurality of parameters; and interleaved with computing, for the other artificial neural the first plurality of values for the other plurality of variables of the other artificial neural network, computing, by the at least one hardware processor, a second plurality of values for the other plurality of variables for the other artificial neural network over the second period.

Behaviors of the artificial neural network may be described by a system of differential equations, the method further including numerically integrating, by the at least one hardware processor, the system of differential equations. Generating the second plurality of values for the plurality of parameters may include identifying, by the at least one hardware processor, a system model for a robot; and returning, by the at least one hardware processor, a system model for the robot.

A system may be summarized as including at least one processor; at least one non-transitory computer-readable storage media communicatively coupled to the first processor, and which stores at least one of processor-executable instructions or data thereon which when executed causes the at least one processor to: define an artificial neural network including a plurality of parameters and a plurality of variables; compute, over a first period, a first plurality of values for the plurality of variables based on a first plurality of values for the plurality of parameters; calculate a first plurality of incremental errors for the artificial neural network over the first period; generate a second plurality of values for the plurality of parameters; and interleaved with calculation of the first plurality of incremental errors for the artificial neural network over the first period, compute, over a second period, a second plurality of values for the plurality of variables based on the second plurality of value for the plurality of parameters.

When executed, the processor-executable instructions may further cause the at least one processor to compute, over a third period, a third plurality of values for the plurality of variables based on the second plurality of values for the plurality of parameters; calculate a second plurality of incremental errors for the artificial neural network over the third period; generate a third plurality of values for the plurality of parameters; and interleaved with calculation of the second plurality of incremental errors for the artificial neural network over the third period, compute, over a fourth period, a fourth plurality of values for the plurality of variables based on the fourth plurality of values for the plurality of parameters.

The artificial neural network may be associated with an objective function, and when executed, the processor-executable instructions may further cause the at least one processor to: compute a gradient for the objective function with respect to the plurality of parameters; and perform gradient descent with the gradient creating the second plurality of values for the plurality of parameters.

When executed, the processor-executable instructions may further cause the at least one processor to: unfold the artificial neural network over a duration less than or equal to the first period creating an unfolded artificial neural network; and perform backpropagation through time on the unfolded artificial neural network.

The system may further include a sensor subsystem coupled to the at least one processor; and where, when executed, the processor-executable instructions further cause the at least one processor to: receive a plurality of input values for the artificial neural network from the sensor subsystem.

The system may further include a robot coupled to the at least one processor; and where, when executed, the processor-executable instructions further cause the at least one processor to: produce a plurality of output values for the artificial neural network; and cause the robot to move based on the plurality of output values.

The system may further include a network interface subsystem coupled to the at least one processor; and where, when executed, the processor-executable instructions further cause the at least one processor to: send the plurality of variables of the artificial neural network; and send the plurality of parameters of the artificial neural network.

The system may further include a network interface subsystem coupled to the at least one processor; and where, when executed, the processor-executable instructions further cause the at least one processor to: receive the plurality of variables of the artificial neural network; and receive the plurality of parameters of the artificial neural network.

A system may be summarized as including at least one processor; at least one non-transitory computer-readable storage media communicatively coupled to the first processor, and which stores at least one of processor-executable instructions or data thereon which when executed causes the at least one processor to: define an artificial neural network including a first part and a second part, the first part of the artificial neural network comprising a first plurality of weights, the second part of the artificial neural network comprising a second plurality of weights, and a plurality of variables; operate the first part of the artificial neural network in a forward direction for a first period according to a first plurality of values for the first plurality of weights; operate the first part of the artificial neural network in a backward direction over the first period according to the first plurality of values for the first plurality of weights; update the first plurality of weights for the first part the artificial neural network to a second plurality of values for the first plurality of weights; interleaved with operation of the first part of the artificial neural network in the backward direction over the first period, operate the first part of the artificial neural network in the forward direction for a second period according to the second plurality of values for the first plurality of weights; operate the second part of the artificial neural network in the forward direction for the first period according to a first plurality of values for the second plurality of weights; operate the second part of the artificial neural network in the backward direction over the first period according to the first plurality of values for the second plurality of weights; update the second plurality of weights for the second part the artificial neural network to a second plurality of values for the second plurality of weights; and interleaved with operation of the second part of the artificial neural network in the backward direction over the first period, operate the second part of the artificial neural network in the forward direction for the second period according to the second plurality of values for the second plurality of weights. The at least one processor may include a first processor; and the processor-executable instructions when executed may cause the first processor to: operate the first part of the artificial neural network in the forward direction for the first period according to the first plurality of values for the first plurality of weights; and operate the first part of the artificial neural network in the forward direction for the second period according to the second plurality of values for the first plurality of weights. The at least one processor may include a second processor; and the processor-executable instructions when executed may cause the second processor to: operate the first part of the artificial neural network in the backward direction over the first period according to the first plurality of values for the first plurality of weights; and update the first plurality of weights for the first part the artificial neural network to the second plurality of values for the first plurality of weights. The at least one processor may include a third processor; and the processor-executable instructions when executed may cause the third processor to: operate the second part of the artificial neural network in the forward direction for the first period according to the first plurality of values for the second plurality of weights; and operate the second part of the artificial neural network in the forward direction for the second period according to the second plurality of values for the second plurality of weights. The at least one processor may include a fourth processor; and the processor-executable instructions when executed may cause the second processor to: operate the second part of the artificial neural network in the backward direction over the first period according to the first plurality of values for the second plurality of weights; and update the second plurality of weights for the second part the artificial neural network to the second plurality of values for the second plurality of weights.

The first artificial neural network may be associated with an objective function, and when executed, the processor-executable instructions may further cause the at least one processor to: perform backpropagation through time to the first artificial neural network creating a gradient for the objective function with respect to the plurality of weights; and perform gradient descent with the gradient for the objective function creating the second plurality of values for the plurality of parameters.

The system may further include a sensor subsystem coupled to the at least one processor; and where, when executed, the processor-executable instructions further cause the at least one processor to: receive a plurality of input values for the artificial neural network from the sensor subsystem.

The system may further include a robot coupled to the at least one processor; a motion subsystem included in the robot; and where, when executed, the processor-executable instructions further cause the at least one processor to: produce a plurality of output values for the artificial neural network; and cause, via the motion subsystem, the robot to move based on the plurality of output values.

The system may further include a network interface subsystem coupled to the at least one processor; and where, when executed, the processor-executable instructions further cause the at least one processor to: send the plurality of variables of the artificial neural network; and send the first plurality of weights and the second plurality of weights.

The system may further include a network interface subsystem coupled to the at least one processor; and where, when executed, the processor-executable instructions further cause the at least one processor to: receive the plurality of variables of the artificial neural network; and receive the first plurality of weights and the second plurality of weights.

The system may further include a user interface, coupled to the at least one processor; and where, when executed, the processor-executable instructions further cause the at least one processor to: receive, from the user interface, input for the first part of the artificial neural network.

The system may further include a user interface, coupled to the at least one processor; and where, when executed, the processor-executable instructions further cause the at least one processor to: receive, from the user interface, input to parameterize an objective function for training the first part of the artificial neural network.

A method of operation of a distributed system, including a first host and a second host, may be summarized as including causing, via at least one hardware processor, the execution an application including a first agent, a second agent, and a plurality of parameters, wherein the first host executes the first agent, and the second host executes the second agent; causing, via the at least one hardware processor, the first agent to send a message to the second agent; updating, via the at least one hardware processor, a history of agents data structure with information that defines a first set of temporally ordered local connections for the first agent and information that defines a second set of temporally ordered local connections to the second agent; forming, via the at least one hardware processor, a part of an inverse application to the application from at least the history of agents data structure, the first agent, and the second agent; causing, via the at least one hardware processor, the evaluation of the part the inverse application; and updating, via the at least one hardware processor, the plurality of parameters of the application.

The method may further include receiving, via the at least one hardware processor, a system specification document defining a plurality of agents and the plurality of parameters, the plurality of agents including the first agent and second agent.

The method may further include updating, via the at least one hardware processor, a directed acyclic graph included in the history of agents data structure. Causing the execution of an application may include operating, via the at least one hardware processor, an artificial neural network in a forward direction.

The method wherein the artificial neural network may be a recurrent neural network and the method may further include numerically integrating, via the at least one hardware processor, a system of differential equations that define a plurality of activations for the recurrent neural network. Causing the execution of the part the inverse application may include operating, via the at least one hardware processor, an artificial neural network in a backward direction. Operating an artificial neural network in a backward direction may include performing, via the at least one hardware processor, back propagation through time on the artificial neural network.

The method may further include producing, via the at least one hardware processor, a plurality of output values for the application; and causing, via the at least one hardware processor, a robot to move based on the plurality of output values.

The method may further include receiving, via the at least one hardware processor, information that characterizes an event; processing, via the at least one hardware processor, the information that characterizes the event; and directing, via the at least one hardware processor, the first host to execute the first agent based on the presence of the information that characterizes the event. Causing the first agent to send the message to the second agent may include receiving, via the at least one hardware processor, information that characterizes an event; processing, via the at least one hardware processor, the information that characterizes the event; and directing, via the at least one hardware processor, the first agent to send the message to the second agent based on the presence of the information that characterizes the event.

The method may further include establishing, via the at least one hardware processor, the distributed system with a maximum latency guarantee.

A system may be summarized as including at least one processor; at least one non-transitory computer-readable storage media communicatively coupled to the first processor, and which stores at least one of processor-executable instructions or data thereon which when executed causes the at least one processor to: execute an application including a first agent, a second agent, and a plurality of parameters;

cause the first agent to send a message to the second agent; update a history of agents data structure with information that defines a first set of temporally ordered local connections for the first agent and information that defines a second set of temporally ordered local connections to the second agent; form a part of an inverse application to the application from at least the history of agents data structure, the first agent, and the second agent; evaluate the part the inverse application; and update the plurality of parameters of the application.

When executed, the processor-executable instructions may further cause the at least one processor to: receive a system specification document defining a plurality of agents and the plurality of parameters, the plurality of agents including the first agent and second agent. The history of agents data structure may include a directed acyclic graph.

When executed, the processor-executable instructions may further cause the at least one processor to: operate an artificial neural network in a forward direction.

When executed, the processor-executable instructions may further cause the at least one processor to: numerically integrate a system of differential equations that define a plurality of activations for the recurrent neural network.

When executed, the processor-executable instructions may further cause the at least one processor to: operate an artificial neural network in a backward direction.

When executed, the processor-executable instructions may further cause the at least one processor to: perform back propagation through time on the artificial neural network.

The system may further include a robot communicatively coupled to the at least one processor; and wherein, when executed, the processor-executable instructions further cause the at least one processor to: produce a plurality of output values for the application; and cause the robot to move based on the plurality of output values.

When executed, the processor-executable instructions may further cause the at least one processor to: receive information characterizing an event; process the information characterizing an event; and direct the first host to execute the first based on the presence of the information characterizing the event.

When executed, the processor-executable instructions may further cause the at least one processor to: receive information characterizing an event; process the information characterizing the event; and direct the first agent to send the message to the second agent based on the presence of the information characterizing the event.

When executed, the processor-executable instructions may further cause the at least one processor to: establish the distributed system with a maximum latency guarantee.

The system may further include a first host computer, communicatively coupled to the at least one processor, wherein the first host computer executes the first agent; a second host computer, communicatively coupled to the at least one processor, wherein the second host computer executes the second agent; and a communication channel that communicatively couples first host computer and the second host computer, wherein the communication channel has a maximum latency guarantee.

A method of operation for an artificial neural network, wherein the artificial neural network may include a plurality of parameters, a plurality of input units, a plurality of hidden units, and a plurality of output units, may be summarized as including providing, via at least one hardware processor, input to the artificial neural network over a first time series; computing, by the at least one hardware processor, a plurality of values for the hidden units for the artificial neural network; computing, by the at least one hardware processor, a plurality of values for the output units for the artificial neural network over a second time series; causing, by the at least one hardware processor, the robot to take action based on the plurality of values for the output units over the second time series; receiving, by the at least one hardware processor, at least two true output values; evaluating, by the at least one hardware processor, an objective function, wherein the objective function includes as operands: two or more values from the plurality of values for the output units, and the at least two true output values; and optimizing, by the at least one hardware processor, the objective function with respect to the parameters.

The method may further include returning, by the at least one hardware processor, information characterizing a system identification.

The method may further include defining, by the at least one hardware processor, the first time series in terms of a first frequency.

The method may further include defining, by the at least one hardware processor, the second time series in terms of a second frequency.

The method may further include receiving, by the at least one hardware processor, the objective function.

The method may further include receiving, by the at least one hardware processor, the input from an operator interface.

The method may further include receiving, by the at least one hardware processor, the input from a sensor subsystem wherein the sensor subsystem provides information that characterizes an environment.

The method may further include executing, by the at least one hardware processor, a write agent including a trigger expression, and a body expression; and receiving, by the at least one hardware processor, the input from the write agent. Reading at least two true output values may include executing, by the at least one hardware processor, a read agent including a trigger expression, and a body expression; executing, by the at least one hardware processor, the trigger expression within the read agent; and executing, by the at least one hardware processor, the body expression within the read agent. Computing the plurality of values for the hidden units for the artificial neural network, and computing the plurality of values for the output units for the artificial neural network over the second time series, may include operating by the at least one hardware processor, the artificial neural network in a forward direction. Optimizing the objective function with respect to the parameters may include operating by the at least one hardware processor, the artificial neural network in a backward direction.

A method of operation for an artificial neural network, wherein the artificial neural network may include a plurality of input units, a plurality of hidden units, and a plurality of output units, and may be summarized as including providing, via at least one hardware processor, input to the artificial neural network over a first time series; computing, by the at least one hardware processor, a plurality of values for the hidden units over the first time series; producing, by the at least one hardware processor, a plurality of values for the output units over a second time series; receiving, by the at least one hardware processor, at a target output value; evaluating, by the at least one hardware processor, an objective function over the second time series, wherein the objective function includes as operands: the plurality of values for the output units, and the target output value; and optimizing by the at least one hardware processor, the objective function with respect to the input.

The method may further include causing, by the at least one hardware processor, a body on a robot to move based on one or more of the plurality of values for the output units.

The method may further include returning, by the at least one hardware processor, information characterizing a predictive model.

The method may further include defining, by the at least one hardware processor, the first time series in terms of a first frequency.

The method may further include defining, by the at least one hardware processor, the second time series in terms of a second frequency.

The method may further include receiving, by the at least one hardware processor, the objective function.

The method may further include receiving, by the at least one hardware processor, the input from an operator interface.

The method may further include receiving, by the at least one hardware processor, the input from a sensor subsystem, wherein the sensor subsystem provides information that characterizes an environment.

The method may further include receiving, by the at least one hardware processor, the input from a write agent, wherein the write agent includes a trigger expression and a body expression; executing, by the at least one hardware processor, the trigger expression within the write agent; and executing, by the at least one hardware processor, the body expression within the write agent. Producing the plurality of values for the output units over the second time series may include executing, by the at least one hardware processor, a trigger expression within a read agent; and executing, by the at least one hardware processor, a body expression within the read agent. Computing the plurality of values for the hidden units over the first time series, and producing the plurality of values for the output units over the second time series may include operating, by the at least one hardware processor, the artificial neural network in a forward direction.

A system including a computer and a robot substantially may be as described and illustrated herein.

A method of operation of a system including a computer and a robot substantially may be as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 6A is a schematic diagram illustrating a portion of a system of agents in accordance with the present systems, devices, articles, and methods.

FIG. 6B is a schematic diagram illustrating the portion of the system of agents form FIG. 6A distributed across a plurality of agents in accordance with the present systems, devices, articles, and methods.

FIG. 16A is a flow-diagram of method of operation for creating predictive models of a system in accordance with the present systems, devices, articles, and methods.

FIG. 16B is a flow-diagram of a worked example from FIG. 16A.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with machine learning and/or robotics, such as processors, sensors, storage devices, and network interfaces, have not been shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment," "example," or "implementation" means that a particular referent feature, structure, or characteristic described in connection with the embodiment, example, or implementation is included in at least one embodiment, example, or implementation. Thus, the appearances of the phrases "in one embodiment," or "in an embodiment," or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the singular forms "a," "an," and "the" include plural referents unless the content clearly dictates otherwise. Thus, for example, reference to a problem-solving system including "an autonomous device" includes a single autonomous device, or two or more autonomous devices. It should also be noted that the term "or" is generally employed in its sense including "and/or" unless the content clearly dictates otherwise.

The headings provided herein are for convenience only and do not interpret the scope or meaning of the embodiments.

Figure 1:
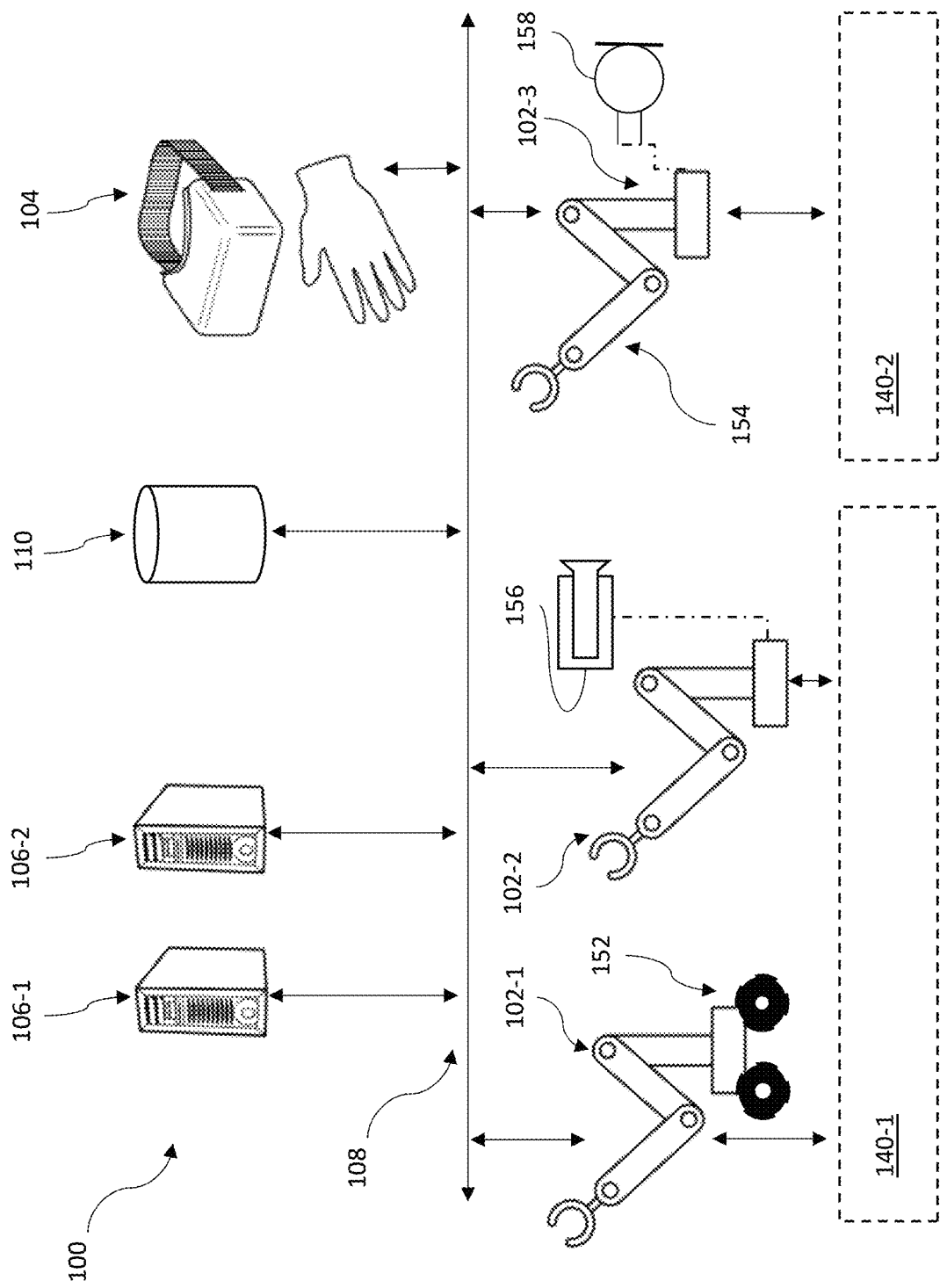
FIG. 1 is a schematic diagram illustrating a portion of a system including distributed hosts that may be used to implement the present systems, devices, articles, and methods.

FIG. 1 shows an exemplary system 100 in accordance with the present system, devices, articles, and method. Various components of system 100 are optional. As shown, the system 100 includes a plurality of hosts 102-1, 102-2, 102-3, 106-1, 106-2 with two or more of the hosts in communication with each other. The plurality hosts includes a plurality of robots 102-1, 102-2, 102-3 (three shown, singularly or collectively 102). The robots 102 may be associated with one or more optional operator interfaces, such as, operator interface 104. The plurality of hosts include a plurality of computers 106-1, 106-2 (two shown, collectively 106). While illustrated as three robots 102-1, 102-2, 102-3 and two computers 106-1, 106-2 various implementations can include a greater or lesser number of robots 102 and/or computers 106.

The plurality hosts may be organized into host groups, where each host group includes two or more hosts selected from robots 102 and/or computers 106. The plurality hosts, e.g., robots 102, and computers 106 are communicatively coupled via one or more network or non-network communication channel 108. Examples of a suitable network or non-work communication channel 108 include a wire based network or non-network communications channel, optical based network or non-network communications channel, wireless network or non-network communications channel, or a combination of wired, optical and/or wireless network or non-network communications channels. In some implementations, the robots 102, operate without a human operator interface 104 or operator, e.g., autonomously. In some implementations, a human operator at operator interface 104 pilots one or more of robots 102. Suitable communication protocols include FTP, HTTP, Web Services, SOAP with XML, and the like. The robots 102 operates in, and receives data about, an environment 140 that comprises the physical space. The robots 102 can share an environment, e.g., robot 102-1 and 102-2, and environment 140-1, or inhabit their own environment, e.g., robot 102-2 and environment 140-2. "About" is employed here in the sense of represent, characterize, or summarize.

A robot, like robots 102, is an electro-mechanical machine controlled by circuitry and/or a processor following processor-executable instructions; a human operator controllable electro-mechanical machine; a robotic subsystem (or apparatus) of another machine including a robot; or the like. A robot performs physical tasks, for example, working with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be part of or included in a larger system like system 100.

A robot typically includes a propulsion or motion subsystem 152 comprising of one or more motors, solenoids or other actuators, and associated hardware (e.g., drivetrain, wheel(s), treads), to propel the robot in a physical space. The space does not need to be horizontal or terrestrial. Examples of spaces include water, air, vertical spaces, outer space and the like.

A robot typically includes a manipulation subsystem 154 comprising one or more appendages, such as, one or more arms and/or one or more associated end-effectors. An end-effector is a device attached to a robotic arm designed to interact with the environment. End-effectors for robot operating in unstructured environments are devices of complex design. Ideally, these are capable of performing many tasks, including for example grasping or gripping or otherwise physically releasably engaging or otherwise interacting with an object.

A robot includes sensor subsystem comprising one or more sensors, such as, one or more cameras 156 and/or one or more microphones 158. A sensor subsystem acquires data for the robots. The data includes environmental sensor information representative of environmental conditions external to the robot. As previously noted sensors can include on board sensors physically coupled to move with the robot and/or remote sensors which are separate and distinct from a given robot. In some instances, a sensor can be on board a first robot 102-1, and remote from a second robot 102-2, while providing information to at least the second robot 102-2.

Figure 2:
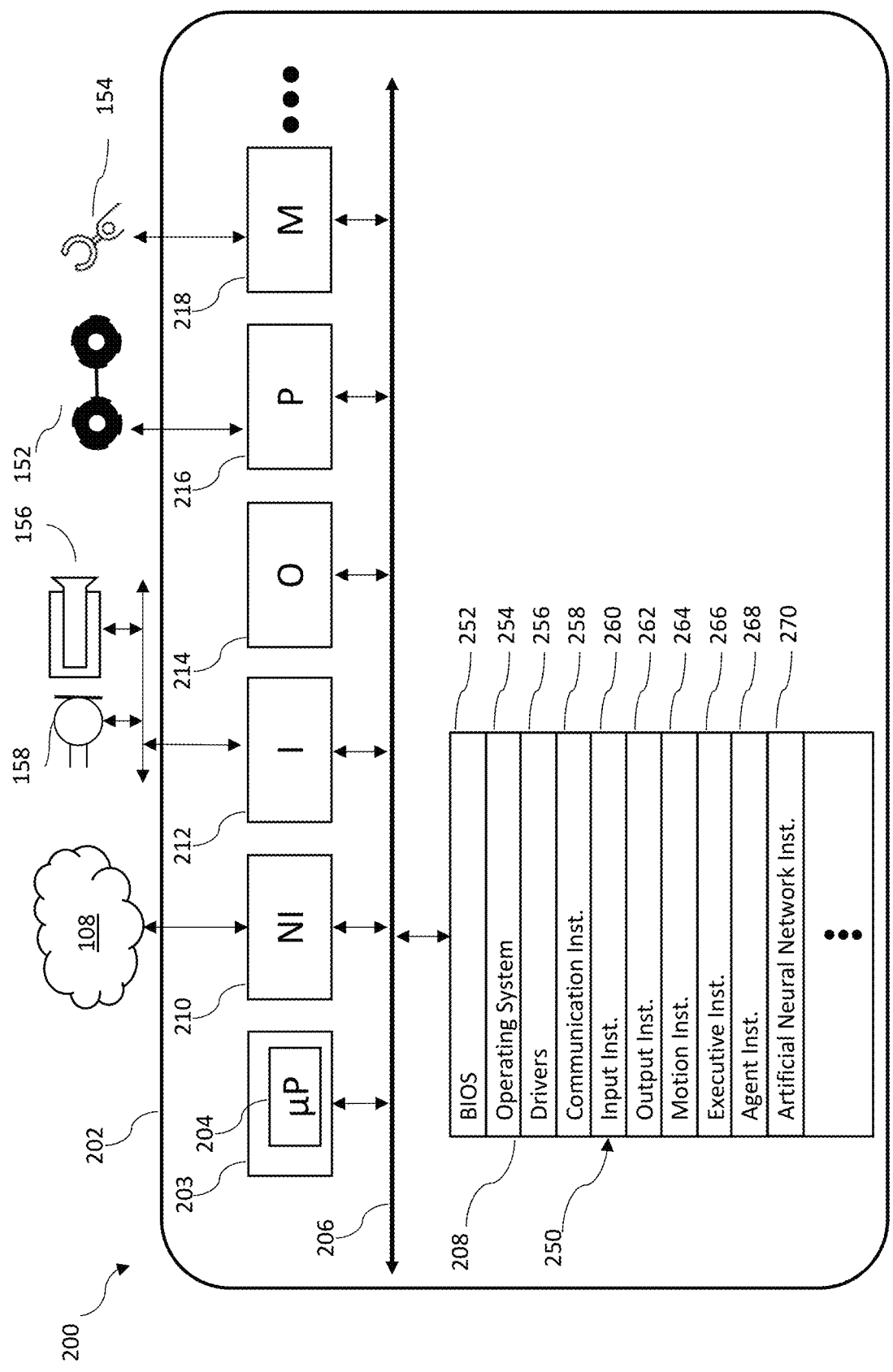
FIG. 2 is a schematic view illustrating an exemplary robot suitable for inclusion in the system of FIG. 1.

FIG. 2 schematically shows parts of a robot, including a processor, for use as a host in the system 100, shown in FIG. 1, in accordance with the present systems, devices, articles, and methods. In some implementations, the host is robotic apparatus such as robot 200. Robot 200 includes at least one body or housing 202, and a control subsystem 203 that includes at least one processor 204, at least one nontransitory computer- or processor-readable storage device 208, and at least one bus 206 to which, or by which, the at least one processor 204 and the storage device(s) 208 are communicatively coupled. In some implementation, a host comprises a sub-set of the illustrated system 200, including control system 203, bus 206, storage device 208, and network interface subsystem 210.

Robot 200 includes a network interface subsystem 210 that is communicatively coupled to bus 206 and provides bi-directional communicative coupling to other systems (e.g., external systems external to the robot 200) via a network or non-network communications channel 108. The network interface subsystem 210 includes one or more buffers. Network interface subsystem 210 receives and sends data related to training machine learning models. Network interface subsystem 210 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI compliant, BLUETOOTH compliant, cellular (e.g., GSM, CDMA), and the like.

The robot 200 includes an input subsystem 212 comprising one or more sensors that detect, sensor, or measure conditions or states of the robot and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like. The robot 200 includes an output subsystem 214 comprising output devices, such as, speakers, lights, and displays. Input subsystem 212 and output subsystem 214, are communicatively coupled to the processor(s) 204 via the bus 206. In some implementations, input subsystem 212 includes receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 includes a propulsion or motion subsystem 216 comprising motors, actuators, drivetrain, wheels, and the like to propel or move the robot 200 within a physical space and interact with it.

Robot 200 includes a manipulation subsystem 218, for example comprising one or more arms, end-effectors, associated motors, solenoids, other actuators, linkages, drivebelts, and the like coupled and operable to cause the arm(s) and/or end-effector(s) to move within a range of motions. The manipulation subsystem 218 is communicatively coupled to processor(s) 204 via bus 206.

A person of ordinary skill in the art will appreciate the components in robot 200 may be varied, combined, split, omitted, or the like. In some implementations one or more of network interface subsystem 210, input subsystem 212, output subsystem 214, propulsion or motion subsystem 216 and/or manipulation subsystem 218 are combined. In some implementations, one or more of the subsystems (e.g., input subsystem 212) are split into further subsystems. In some implementations, the bus 206 is a plurality of buses (e.g., data buses, instruction buses, power buses) included in at least one body. For example, as part of a modular computing architecture where computational resources at distributed over the components of robot 200. That is, a robotic apparatus, like robot 200, could in one embodiment have a processor in a left arm and a storage device in its thorax. In some implementations, computational resources are located in the interstitial spaces between structural or mechanical components of robot 200. A data storage device could be in a leg and a separate data storage device in another limb. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The processor 204 may be referred to in the singular, but may be two or more processors.

Network interface subsystem 210 may be any circuitry effecting bidirectional communication of processor-readable data, and processor-executable instructions. Suitable communication protocols include FTP, HTTP, Web Services, SOAP with XML, and the like.

The at least one storage device 208 is at least one nontransitory or tangible storage device. In some implementations, storage device 208 includes two or more distinct devices. The storage device(s) 208 can, for example, include one or more a volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), a hard disk drive (HDD), a network drive, flash memory, digital versatile disk (DVD), any other forms of computer-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like.

The at least one storage device 208 includes or stores processor-executable instructions and/or processor-readable data 250 associated with the operation of robot 200, system 100, and the like.

The execution of the processor-executable instructions and/or data cause the at least one processor 204 to carry out various methods and actions, for example via the propulsion or motion subsystem 216 and/or manipulation subsystem 218. The processor(s) 204 can cause a robotic apparatus, such as robot 200, to carry out various methods and actions. Processor-executable instructions and/or data 250 can, for example, include a basic input/output system (BIOS) 252, an operating system 254, drivers 256, communication instructions and data 258, input instructions and data 260, output instructions and data 262, motion instructions and data 264, and executive instructions and data 266.

An exemplary operating system 254 includes ANDROID™, LINUX®, and WINDOWS®. The drivers 256 include processor-executable instructions and data that allow processor(s) 204 to control circuitry of robot 200. The processor-executable communication instructions and data 258 include processor-executable instructions and data to implement communications between the robot 200 and an operator console or terminal, a computer, or the like. The processor-executable input instructions or data 260 guide robot 200 in processing input from sensors in input subsystem 212. Processor-executable output instructions or data 262 guide the robot 200 in interacting within the environment via components of manipulation subsystem 218 or output subsystem 214. Processor-executable motion instructions and data 264 guide robot 200 in moving within its environment via components in propulsion or motion subsystem 216.

The processor-executable executive instructions and data 266 guide the robot 200 in reasoning, problem solving, planning tasks, performing tasks, and the like. The processor-executable executive instructions and data 266 implement, in part, the methods described herein, including those in and in relation to FIG. 5, etc.

The processor-executable agent instructions and data 268 guide the robot 200 in performing tasks associated with agents, such as, start agent, stop agent, run processor-executable instructions associated with agent, send data to or from agent, and receive data at agent. The processor-executable agent instructions and data 270 implement, in part, the methods described herein, including those in and in relation to FIGS. 10-13.

The processor-executable artificial neural network instructions and data 268 allow the robot to operate and train an artificial neural network. The processor-executable artificial neural network instructions and data 270 implement, in part, the methods described herein, including those in and in relation to FIGS. 5-9, 15, and 16.

The processor-executable artificial neural networks instructions and data 270 when executed by robot 200 allow the robot to simulate artificial neural networks including forward direction or mode, e.g., feedforward operation, and backward direction, e.g., training an artificial neural network. Examples of methods for operation of artificial neural networks are illustrated in and described with respect to, at least, FIGS. 5, 6, and 8. As used herein and in the claims, the term "artificial" refers to hardware circuitry or hardware processor implementation, i.e., a non-human embodiment, which is distinct from a natural neural network of, for example, the human brain.

Input subsystem 212 comprises sensors or transducers that acquire data for the robot. The data includes sensor information. Sensor information includes environmental sensor information representative of environmental conditions external to robot 200. Sensor information includes robotic conditions or state sensor information representative of conditions or states of the robot including the various subsystems and components thereof. Such sensors may include one or more of cameras or imagers (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Exemplary sensors include camera 156 and microphone 158. Sensor information can, for example, include diagnostic sensor information that is useful in diagnosing a condition or state of robot 200 or environment in which the robot 200 operates. For example, such sensors may include contact sensors, force sensors, strain gages, vibration sensors, position sensors, attitude sensors, accelerometers, and the like. In some implementations, the diagnostic sensors include sensors to monitor a condition and/or health of an on-board power source (e.g., battery array, ultra-capacitor array, fuel cell array).

Output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

Figure 3:
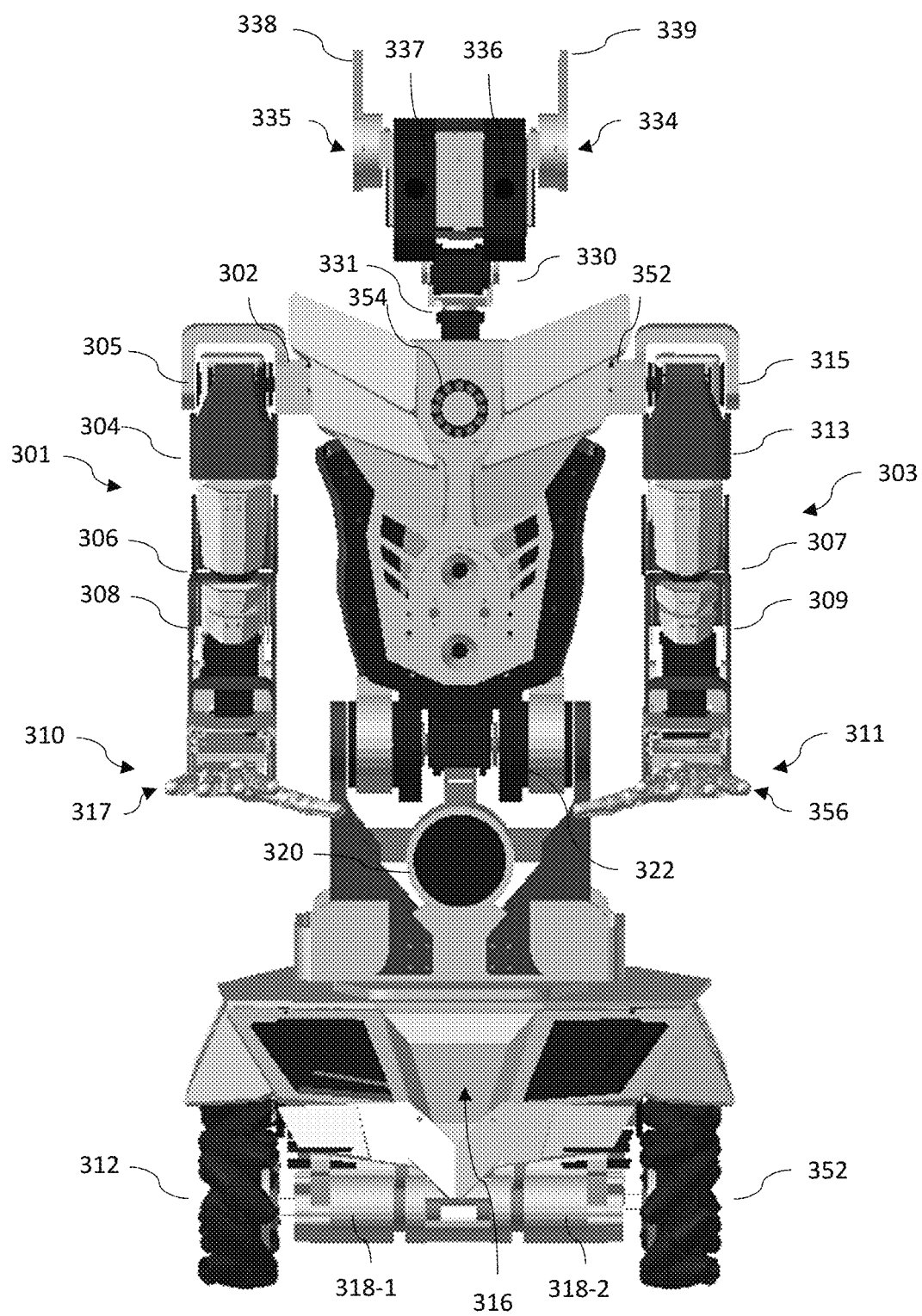
FIG. 3 is an elevation view illustrating a robot in accordance with the present systems, devices, articles, and methods.

FIG. 3 illustrates an exemplary robot 300. As discussed herein, robots may take any of a wide variety of forms. These include human operator controllable robots, autonomous robots with on-board control, autonomous robots controlled by a non-human operator, and hybrid robot (i.e., partially autonomous, partially piloted). A robot comprises one or more bodies, also called structural components, or brackets. The bodies are coupled by joints, for example, bearings, and/or servo-motors. For example, a first body is connected to a second body by a servo or the like. It is possible to describe a robot in terms of the joints or the bodies. FIG. 3 is described in terms of the joints but a person of skill in the art will appreciate a body based description is possible.

In various implementations, shoulder servos 302 and 305 may control and sense roll and pitch respectively of a shoulder of a first arm 301 of robot 300. In some implementations, shoulder servos 302 and 305 may, for example be DYNAMIXEL™ MX-28, MX-64, or AX-12 servo-motors produced by ROBOTIS CO. LTD. of Seoul, South Korea.

In some implementations, the shoulder yaw servo 304 may control and sense the yaw of first arm 301 of the robot 300. In various implementations, the shoulder yaw servo 304 may be a servo-motor like shoulder servos 302 and 305. Yaw is a motion analogous to medial rotation (i.e., inward rotation toward the body) and lateral rotation (i.e., outward rotation away from the body).

In some implementations, elbow servo 306 may control and sense an elbow of the first arm 301 of robot 300. In various implementations, the elbow servo 306 may be a servo-motor like shoulder servos 302 and 305.

In some implementations, the wrist servo 308 may control and sense an end-effector rotation of the robot 300. In some implementations, the wrist servo 308 maybe a servo-motor as described herein and including servos for shoulder servos 302 and 305.

In various implementations, the end-effector 310 may include a plurality of digits 317. For example, four fingers and a thumb are shown in FIG. 3. A thumb is generally regarded as a digit that may be used to oppose two more digits. In the case of an opposed pair of digits the thumb may be the shorter or less mobile digit. In some implementations, the digits of the end-effector 310 may include embedded force sensitive resistors. Respective servos, which may, for example be DYNAMIXEL™ XL-320 servo-motors or TOWERPRO™ hobby servos, may operate each digit independently. The end-effectors may, in some implementations, facilitate dexterous manipulation of objects. Each of shoulder servos 302 and 305, and servo in robot 300, work cooperatively with a respective joint, or joint and gearbox. In various implementations roll is adduction (i.e., appendage moves toward torso) and abduction (i.e., appendage moves away from torso) of first arm 301. In various implementations pitch is flexion (i.e., appendage reduces angle between itself torso of more proximal appendage) and extension (i.e., appendage increases angle) (e.g., backward) of first arm 301.

In some implementations, one or more digits of digits 317 of the end-effector 310 may have polymer filled internal and external structure and/or rubber pads proximate to the extremities of the one or more digits of digits 317. The material may, in operation enhance grip capacity of an end-effector and simulate the resistance of a human finger.

In some implementations, digits, such as digits 317, may each have one or more contact sensors and/or pressure sensors to sense pressure applied to the sensor and produce signals proportional to the pressure.

The second arm 303 is generally similar to the first arm 301 but mirrored. Referring to FIG. 3, the second arm 303 includes a shoulder roll servo 352, a shoulder pitch servo 315, a shoulder yaw servo 313, an elbow servo 307, a wrist servo 309, and end-effector 311 including a plurality of digits 356.

In at least one implementation, the robot 300 includes one or more components including wheels, such as wheel 312 and wheel 352, an electronics compartment 316, DC motors 318-1 and 318-2, a speaker 320, a waist pitch servo(s) 322, an interlock 326 (to share torso support with waist pitch servo(s) 322), a single board computer (SBC) (not shown), two neck servos including a head pitch servo 330 and a head yaw servo 331, ear servos 334 and 335, cameras 336 and 337, microphones 338 and 339, lights/LEDs 354 and cable bundles (not shown).

In some implementations, wheel 312 and wheel 352 provide the capacity for locomotion to the robot 300. Wheel 312 and wheel 352 may provide a broad base which, in some examples, increases stability of the robot 300. In other implementations, one or more treads can provide locomotion.

In various implementations for example, one or more on-board power sources may be found in the compartment 316. The on-board power sources can, for example include one or more batteries, ultra-capacitors, fuel cells, to independently power different components of the robot 300. Servos can be on divided up over different batteries.

Exemplary batteries include secondary cells, for instance lithium polymer cells, for example, a 16V, 10000 mAh, four cell, LiPo battery; a 4000 mAh 3 cell 12 V battery; a 5 V 9600 mAh, USB mobile charging power pack; and a batter pack including one or more 3.7 V lithium ion batteries.

Figure 4:
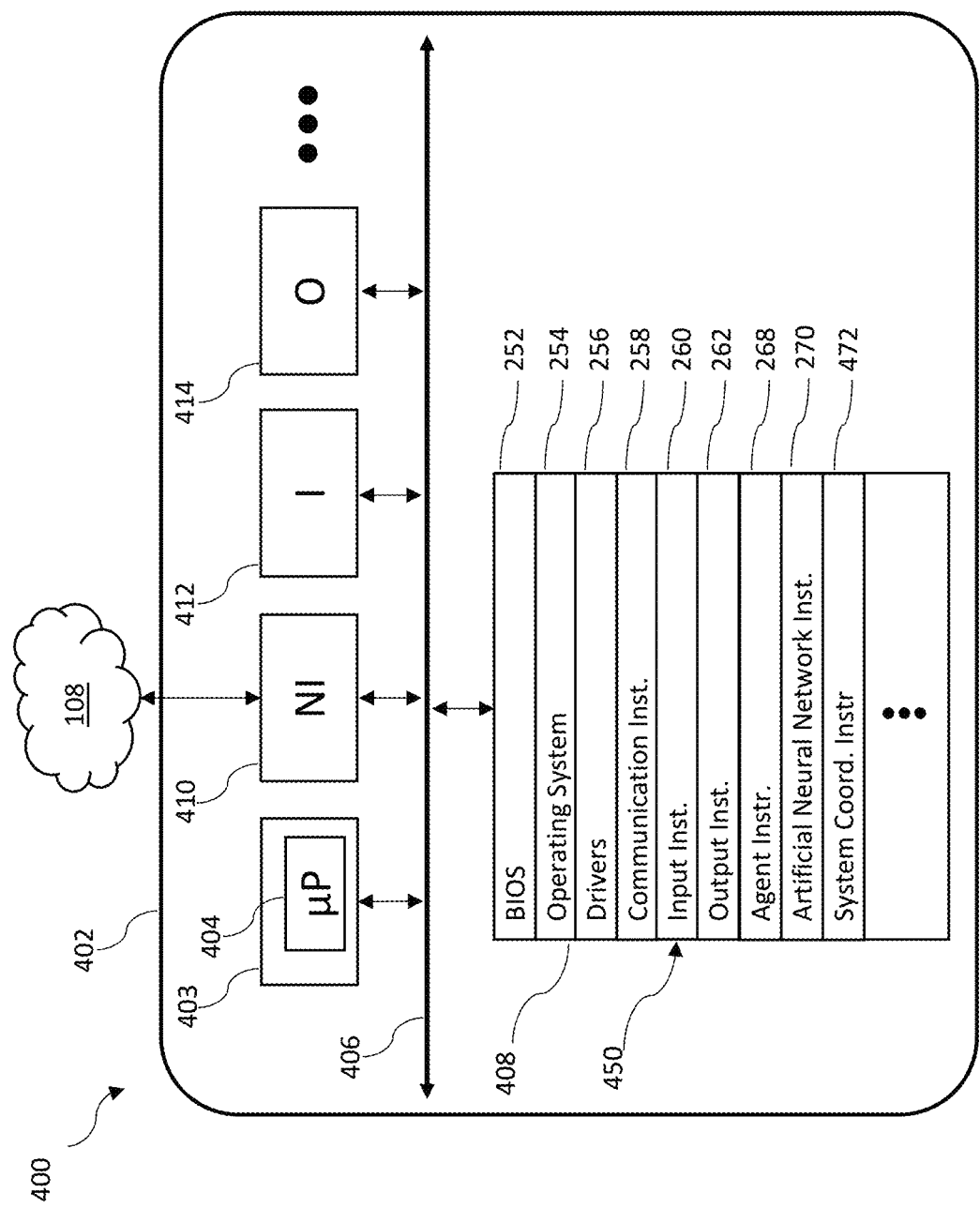
FIG. 4 is a schematic view illustrating an exemplary computer system suitable for inclusion in the system of FIG. 1.

FIG. 4 schematically shows parts of a computer system 400, including a processor, for use as a host in the system 100, shown in FIG. 1 in accordance with the present system, devices, articles, and methods. System 400 shares some similar components with robot 200 but differs in lacking the propulsion or motion sub-system and the manipulation sub-system. System 400 has different sub-components within some sub-systems, such as, the input and output sub-systems.

System 400 includes at least one body or housing 402, and a control subsystem 403 that includes at least one processor 404, at least one nontransitory computer- or processor-readable storage device 408, and at least one bus 406 to which the at least one processor 404 and the at least one nontransitory computer- or processor-readable storage device 408 are communicatively coupled. At least one processor 404 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. Processor(s) 404 may be referred to in the singular, but may be two or more processors.

System 400 includes a network interface subsystem 410 is communicatively coupled to bus 406 and provides bi-directional communicative coupling to other systems (e.g., a system external to computer system 400) via network or non-network communications channel(s) (e.g., communication channel(s) 108). Network interface subsystem 210 includes circuitry. Network interface subsystem 210 may use a communication protocols (e.g., FTP, HTTP, Web Services, and SOAP with XML) to effect bidirectional communication of information including processor-readable data, and processor-executable instructions.

System 400 includes an input subsystem 412. In some implementations, input subsystem 412 includes one or more user interface input devices such as a display a keyboard, a mouse, a microphone, and a camera. In some implementations, the input subsystem 412 includes one or more sensors such as environmental sensors. In some implementations, input subsystem 412 is coupled to the control subsystem 403 via the network interface subsystem 410. The system 400 includes an output subsystem 414 comprising one or more output devices, such as, displays, speakers, and lights. Bus 406 brings input subsystem 412, output subsystem 414, and processor(s) 404 in communication with each other. The at least one nontransitory computer- or processor-readable storage device 408 includes at least one nontransitory storage medium. In some implementations, storage device(s) 408 includes two or more distinct devices. Storage device(s) 408 can, for example, include one or more a volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), a hard disk drive (HDD), a network drive, flash memory, digital versatile disk (DVD), any other forms of computer-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like. The at least one storage device 208 may store on or within the included storage media processor-readable data, and/or processor-executable instructions.

The storage device(s) 408 includes or stores processor-executable instructions and/or data 450 associated with the operation of system 400. In some implementations, the processor-executable instructions and/or data 450 includes a BIOS 252, an operating system 254, drivers 256, communication instructions and data 258, input instructions and data 260, output instructions and data 262, agent instructions and data 268, artificial neural network instructions and data 270, and system coordination instructions and data 472. The processor-executable instructions and/or data 252-262, 268, and 270 are described herein and with appropriate changes are applicable to system 400.

The processor-executable system coordination instructions and data 472 guide the system 400 to start, run, and stop one or more agents. The instructions and data 472 guide the system in establishing and maintaining communication between agents. The instructions and data 472 when executed may direct the system to record data generated in the operation of a system of distributed agents. The processor-executable agent instructions and data 268, processor-executable task instructions and data 270, and/or processor-executable system coordination instructions and data 472, implement, in part, the methods described herein, including those in and in relation to FIGS. 10-13.

Figure 5:
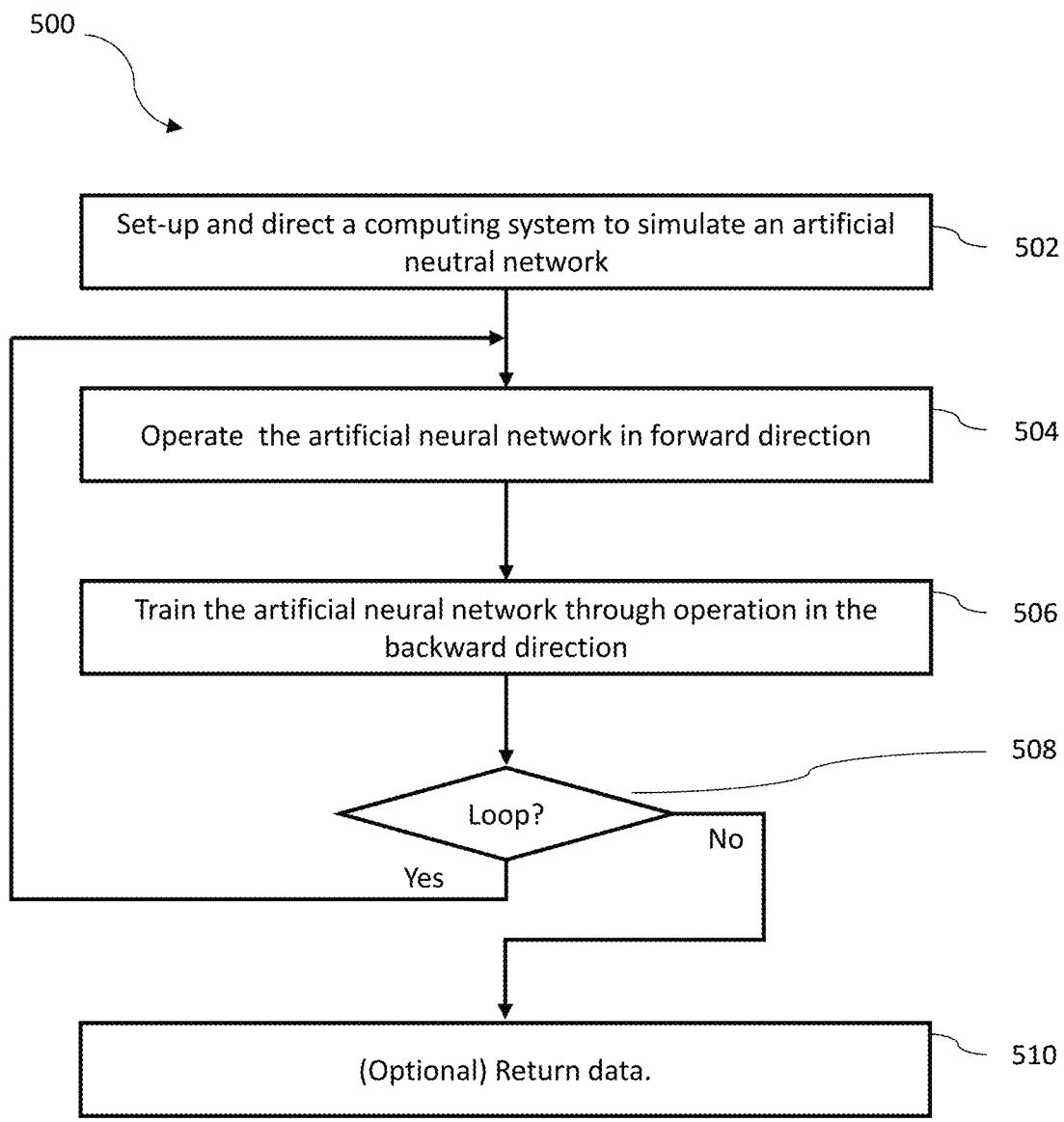
FIG. 5 is a flow-diagram of an implementation of a method of operation of distributed artificial neural networks in accordance with the present systems, devices, articles, and methods.

FIG. 5 shows a method 500 executable by circuitry or at least one hardware processor, that implements various techniques to operate and train at least one artificial neural network (ANN). Those of skill in the art will appreciate that other acts may be included, removed, and/or varied to accommodate alternative implementations. Method 500 is described as being performed by a controller, for example, system 400, robot 102 or computer 106, including a control subsystem or processor(s). However, method 500 may be performed by another system or circuitry. For example, method 500 can be performed by in part by an on-board control subsystem (i.e., on board the robot) 203 in conjunction, or cooperation, with an off-board control system (i.e., external or distinctly physically separate from the robot).

Method 500 begins, for example, in response to an invocation by the controller. At 502, the controller sets-up and directs a computing system to simulate an artificial neural network. That is, run or operate the ANN in a forward direction or a backward direction. The controller simulates the ANN by executing processor-executable instructions that define the ANN. Examples of a suitable computing system include the system 100 (FIG. 1). Examples of artificial neural networks include feedforward neural networks, and recurrent neural networks. In some implementations, the controller directs a distributed system or runs or simulates the artificial neural network.

At 504, the controller simulates the operations of the artificial neural network in a forward direction, phase, or mode. The simulation of the artificial neural network includes modeling the response of the artificial neural network to input. The response of the neural network to input is, for some networks, a computation. In some implementations, the controller stores data created in by the simulation of the ANN in the forward direction. The controller may use the artificial neural network to effect control of a robot. That is, direct a robot's motions. In some implementations, the controller directs a distributed system to simulate the artificial neural network in the forward direction. In some implementations, the controller interleaves act 504 with act 506.

An exemplary artificial neural network includes a plurality of units and a plurality of edges. A processor, or other circuity such as, artificial neural network circuitry, implement a unit by executing processor-executable instructions and data. A unit accepts one or more inputs and applies a non-linear transform to this input. The output of the non-linear transform, or activation function, is both the state of the unit and the output of the unit and is recorded, or read from, computer-readable media including processor-readable data. The units in a network may be arranged into groupings of one or more units. A conventional grouping is a layer that includes units of same depth in the network relative to other units and/or layers. Depth may be expressed as a count of links. Sometimes layers are characterized by an absence of intra-layer edges. The output and state of a unit is a linear combination of inputs, e.g., previous layer, transformed by an activation function. This maybe expressed as:

$$a_j = g(\Sigma_{i=0}^n W_{i,j} a_i) \quad (1)$$

The activation $a_i$ is for unit i, $W_{i,j}$ is a matrix including the weights between the input units to unit j, and g is an activation function. The matrix $W_{i,j}$ is recorded in, and read from, computer-readable media including processor-readable data. The activation is a state of a unit and a number represents the activation. In some implementations, the activation of a unit is a value between zero and one. An activation function, such as g, has two useful aspects. One, an activation function is non-linear in effect. If the activation functions were linear any multi-layer ANN could collapse (e.g., rewritten) to a single input and output layer. Examples of non-linear activation functions include non-linear functions, piecewise linear functions, and step functions. Two, an activation function provides an output regarded as active, for example, a value of one or almost one, for the correct input and provides an output regarded as inactive, for example, a value of zero or almost zero, for the incorrect input. In some implementations, correct and incorrect are separated by a threshold value. One suitable function is proportional to a sigmoid function. Alternatives suitable functions are proportional to symmetric sigmoid function, softmax function, Heavyside function, complementary bipolar function, hyperbolic tangent, LeCun's hyperbolic tangent function, logit function, or a product of a polynomial function and any of the forgoing.

At 506, controller trains the artificial neural network over data. This is termed as operating in the backward direction. In some implementations, the data comes from other hosts or robots. In some implementations, the data is from one or more environmental sensors to one or more robots. Training an artificial neural network involves simulating the network and evolving (or adapting) of weights for the units and edges of the neural network until an exit condition is reached. Examples of exit or termination conditions include minimum value of objective function, value of objective function below a threshold, lack of change in an objective function, time, and number of steps. The weights for the units and edge are parameters of the ANN and used in the forward direction. In some implementations, a gradient decent based method is used. In some implementations, a backpropagation method is used. In some implementations, the controller determines a plurality of incremental errors associated with the variables in the ANN. In some implementations, the controller stores data created during the simulation of the ANN in the backward direction.

In some implementations, act 506 and act 508 are interleaved. The interleaved acts overlap in time for part of the duration of each act. One act can begin before another; end after the other; begin and end during the other's duration; begin, suspend, and resume while the other is doing much the same; and the like.

At 508, the controller tests if method 500 is to loop, e.g. is a termination condition present. If the method 500 is to loop, (e.g., no termination condition present, i.e., 508—Yes) control passes to act 504. If the method is not to loop, (e.g., a termination condition is present, i.e., 508—No) the method 500 ends until invoked again.

At optional act 510, the controller returns the weights and other information about the network and the training. "About" is employed here in the sense of represent, characterize, or summarize. For example, the controller returns information characterizing or representing the number of iterations taken in a training method, the nature of the training method, or hyper-parameters used in the training method.

A recurrent network is an artificial neural network including cycles. Recurrent networks include special hidden units (sometimes called context units), that are determined not just by time, t, but by the internal state of the network at a previous time. Mathematically a recurrent neural network can be an expression for output units o, hidden units h, input units i, and context units c (being a special case of hidden units). A descriptive set of equations includes:

$$h(t) = f_1[i(t), c(t-1)]$$

$$o(t) = f_2[h(t)]$$

$$c(t) = f_3[h(t)] \quad (2)$$

The hidden units are a function of input, and previous state of the context units. The output units and the context units are a function of hidden units. Here, time is a natural number. Continuous time recurrent networks are different in that time, t, is a value on the real number line. A system of differential equations is one way to express continuous-time dynamics for a network. An example is a differential equation in the rate of change of activation at a hidden unit. Another is a system of differential and algebraic equations. For example:

$$h^{(t)} = \alpha h(t) + \beta f_1[i(t), c(t-1)]$$

$$o(t) = f_2[h(t)]$$

$$c(t) = f_3[h(t)] \quad (3)$$

Where $\alpha$ and $\beta$ are values that need to be learned such that the recurrent network can be used to process information from sensor(s), e.g., real-time streams of stimuli. The outputs of recurrent networks may be control signals to make a robot, move, talk, and the like; or be motion, speech, and the like.

Revisiting FIG. 5, the illustrated method includes a loop of including running an ANN in a forward direction and a backward direction. Focusing on acts 504 and 506, there is a method that begins at invocation by the controller. The controller runs the artificial neural network in the forward direction. The controller may effect control of a robot over time. The controller operates the artificial neural network in the backward direction. That is, updates the parameters of the ANN in view of the input, output, and objective function. In some implementations, the controller uses back propagation through time. In some implementations, the controller determines a gradient for the ANN and then updates the parameters. In some implementations, the controller uses a gradient descent, e.g., standard, stochastic, and momentum enhanced.

In some embodiments, the ANN is a recurrent neural network. A recurrent neural network includes cycles of edges. In some embodiments, the controller runs the recurrent neural network backward by first unfolding the recurrent neural network. Then the controller backpropagates to optimize an objective function over the unfolded recurrent neural network In some embodiments, the controller operates the artificial neural network in the forward direction. The controller then operates the artificial neural network in the backward direction. The time the controller operates the ANN forward direction can be called a forward phase. A backward phase is counterpart to the forward phase. In some implementations, there are a plurality of different types of forward direction, phase, or mode. The controller continues the alternation of forward and backward phases until termination described herein.

The forward and backward operations are sequential and alternating. In some implementations, the operations are sequential but not strictly alternating. In some implementations, the operations are performed in parallel.

In some embodiments, the controller simulates the ANN in the forward direction by numerically integrating differential equations that describe the operation of the ANN. For example, where the ANN is a recurrent neural network and modelled as a continuous time recurrent neural network then a first order differential equation in the rate of change of activation at a unit can be integrated to determine the activation at the unit. A differential equation is often expressed in explicit form as derivative of a given order for a dependent variable equal to a function of an independent variable, the dependent variable, and one or more derivatives of the dependent variable of an order less than the given order. For example, y'=f(x, y). One can find a solution to the differential equation by discretizing the variables and numerically integrating the discretized equation. Example integration techniques include determining a sequence of values according to:

$$y_{n+1}=y_n+(1-\theta)hf(x_n,y_n,y_n^{(1)},\ldots)+\theta hf(x_{n+1},y_{n+1},y_{n+1}^{(1)},\ldots) \quad (4)$$

Where $y_n$ is the dependent variable at step n, $x_n$ is the dependent variable at the same step, h is the different between step n+1 and n, f is the differential equation in explicit form, and θ is a tunable parameter. For example, function f can be the rate of change of activation at a unit in an artificial neural network. When θ=0 the technique is Forward Euler. When θ=1 it is Backward Euler. Intermediate values are hybrid techniques and θ=½ corresponds to the Crank-Nicolson method. Backward Euler and hybrid techniques are more numerically stable.

FIG. 6A and FIG. 6B are schematic diagrams illustrating a portion of an artificial neural network (ANN) 600 including a plurality of inputs 602, a plurality of edges 603, a plurality of sets of ANN variables 604, and a plurality of outputs 606. ANN 600 includes a plurality of edges 603 disposed between the plurality of inputs 602, the plurality of ANN variables 604, and the plurality of outputs 606. In some implementations, one or more sets of ANN variables in the plurality of ANN variables 604 includes ANN variables and further edges. FIGS. 6A and 6B depict the flow of information through the ANN 600. As illustrated, the information is shown flowing in the forward direction along edges 603.

In some implementations, the ANN 600 handles multimodal inputs. For example, the ANN 600 receives input, as sensor information, from one or more sensors, either directly or indirectly, for instance from one or more imagers (e.g., video, sequential images), microphones (e.g., audio), motor sensors or motors (e.g., rotational encoder, stepper motor), touch sensors, force sensor, and the like. The ANN receives some input at regular intervals, e.g., video at 30 frames per second and audio. Some input is received episodically, e.g., motor information when motors are running. Some input arrives irregularly, or in an event driven way, e.g. speech word-recognition.

In some implementations, the ANN 600 has output. For example, the ANN 600 emits plurality of outputs 606 of one or more types. Examples of types of output include motion, actuator output, speech, audio, video, and the like. The rate of output can differ between outputs in the plurality of outputs 606.

In some implementations, the ANN 600 runs in real time. The ANN 600 runs across a plurality of hosts (e.g., computers, robots). In some implementations, the ANN runs distributed on a plurality of hosts with a variety computational capacities.

FIG. 6B illustrates the portion of ANN 600 distributed over two hosts. In the illustrated example, the ANN is simulated on two hosts, i.e., host 652 and host 654. A portion of the plurality of edges couple parts of ANN 600 in one host to parts of ANN 600 in another host.

Operation of an ANN on a distributed plurality of hosts is, with technical and practical effect, different from a non-distributed system. The information flow between the hosts has two directions. The hosts may operate in a forward direction (as shown) with information flowing from input layer of ANN to output layer and routed between hosts as may be needed. The hosts may operate in a backward direction with the reverse information flow. For example, in forward direction a first host, e.g., host 652, creates output consumed by other hosts, e.g., host 654. In forward direction the one host is a source, the other hosts are sinks arranged for instance in a fan-out structure. In backward operation, the role of sources and sinks are reversed with one host assuming a collect roll. However, fan-out and collect operations don't paralyze in the same way. For example, every "fire off" and "forget forward" message in a fan-out operation is a potential "check, wait, recheck" (e.g., spin lock) backward message in a collect operation. Thus an ANN distributed over a plurality of hosts will need to, for either the forward or backward operations, handle delays in receiving variables due to communication lag and computation lag.

The operation of an ANN on a distributed plurality of sets of ANN variables 604 is technically different from a non-distributed plurality of sets of ANN variables. The operation of an ANN in a distributed environment also leads to spin locking as described herein above.

The execution of a distributed application, characterized by a directed acyclic graph, by two more hosts is technically different from a non-distributed execution of the same application by one host. The dependencies of the parts of the application have to be accounted for. As well, if the directed acyclic graph is not distributed along with the parts of the application then inverting the application is hard for any host.

System 600 can include two or more artificial neural networks. In some implementations, one or more hosts simulate two or more artificial neural networks. The two or more artificial neural networks can have different objective functions. One network could implement a control system for a robot. When the ANN is used as a control system to control a robot, an example objective function is a suitable reward function to optimize control of the robot. An example of an objective function includes a task specific cost function, an error function parameterized by demonstrated motion, or a value function. In some implementations, an objective function is proportional the absolute difference between a set of target values and the output of the ANN. The set of target values may be derived from information characterizing or representing demonstrated motion of the robot via information received from an operator interface, such as, operator interface 104.

A second network, within system 600 or similar system, could implement a predictive control model. A second network, within system 600 or similar system, could implement a system model. An example of an objective function may vary with the application for the model. When the ANN is used to create and store a model of the environment, a suitable objective function is proportional the absolute difference between a set of target values and the output of the ANN. The set of target values can be drawn from information characterizing or representing an environment, such as, environment to a host. That is, an objective function based on differences between the system model for an environment and the actual or real environment.

Figure 7:
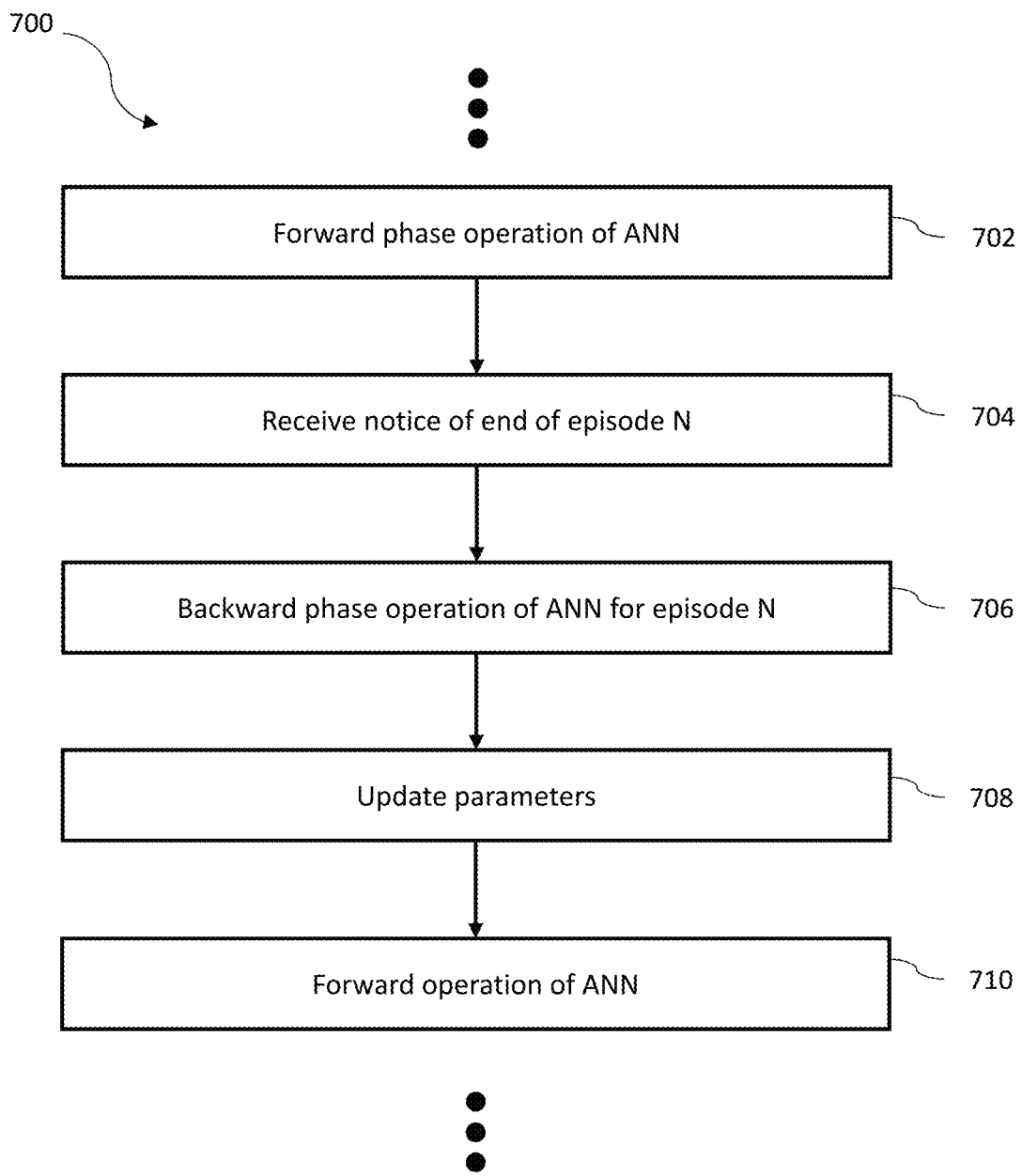
FIG. 7 is a flow-diagram of an implementation of a sequential method for operation of an artificial neural network in accordance with the present systems, devices, articles, and methods.

FIG. 7 shows a method 700 operation in forward mode and backward mode in sequential acts. Method 700 does not have a two-part alternation like that shown in FIG. 5, but rather a more complicated cadence with unequal durations of phase. Those of skill in the art will appreciate that other acts in method 700 may be included, some acts omitted, and/or acts performed in different orders to accommodate alternative implementations. The method 700 is described as being performed by a controller, for example, robot 102 or computer 106, including a control subsystem or processor(s). However, the method 700 may be performed by another system, and more than one computing system. As well, the method 700 can be performed off-line to train an ANN.

The method 700 is potentially part of a larger method. That is, method 700 begins at 702 or at a time prior to act 702. For example, method 700 began many episodes previously to present time.

At 702, the controller simulates an ANN in the forward direction. The controller calculates one or more sets of values for the variables present in the ANN. The controller simulates the ANN until informed that the present period or episode has expired. An example episode length is several seconds. In some implementations, time is discretized and an episode is a number of time steps. That is time is a value on the natural number line. During the forward direction simulation 702, the controller stores values generated in the simulation of the ANN.

At 704, the controller receives information characterizing or representing notice of the end of a present episode. For example, episodes can be numbered and the present episode referred to as N. In some implementations, the information characterizes or represents the time bonds on the episode: start time and end time. The end time need not be coterminous with the present time in act 704. That is the forward operation can occur without knowledge of episode information.

At 706, the controller simulates the ANN in the backward direction. That is, the controller trains the ANN based on values stored in act 702. The controller steps backward through time in the present episode (i.e., the episode just completed). In some implementations, the controller determines new parameters, e.g., weights, for the ANN at each time step. In some implementations, the controller determines new parameters for the ANN at the "start" of the present episode. That is, the end of the episode since act 706 runs in reverse over the episode. In some implementations, the controller calculates gradients for an objective function with respect to the parameters of the ANN. In some implementations, the controller uses the gradients to update the parameters using gradient descent including the versions of gradient descent described herein.

At 708 the controller updates information characterizing or representing the parameters within the artificial neural network. For example, the controller makes available the parameters for future forward direction operations. In some implementations, the controller distributes the information characterizing or representing the parameters within the artificial neural network, e.g., weights, to other agents in a distributed system.

At 710, the controller simulates an ANN in the forward direction. Act 710 and act 702 are, in some implementations, the same or identical in operation. The controller calculates one or more sets of values for the variables present in the ANN. The controller continues until receipt of notice of the end of the next episode, e.g., N+1. Again, the bounds on the next episode may unequal to the bounds on act 710. The duration of the episode is less than or equal to the duration the controller simulates the ANN over.

The process continues until termination, executing in a forward direction, e.g., act 702, followed backward direction, e.g., acts 706, and then parameter distribution, e.g., act 708. In some implementations, a controller may execute method 700 to create a substantially alternating cadence. In some implementations, the duration of the present episode and the duration of act 702 are the same in temporal length. In some implementations, the present and next episodes have the same duration as one another. In some implementations, the method 700 has a substantially episode or episodic cadence, e.g., long forward phases interrupted by other acts. The method 700 is sequential in that the backward phase at act 706 may block the operation of a greater application, such as, an application defined by an ANN.

Figure 8:
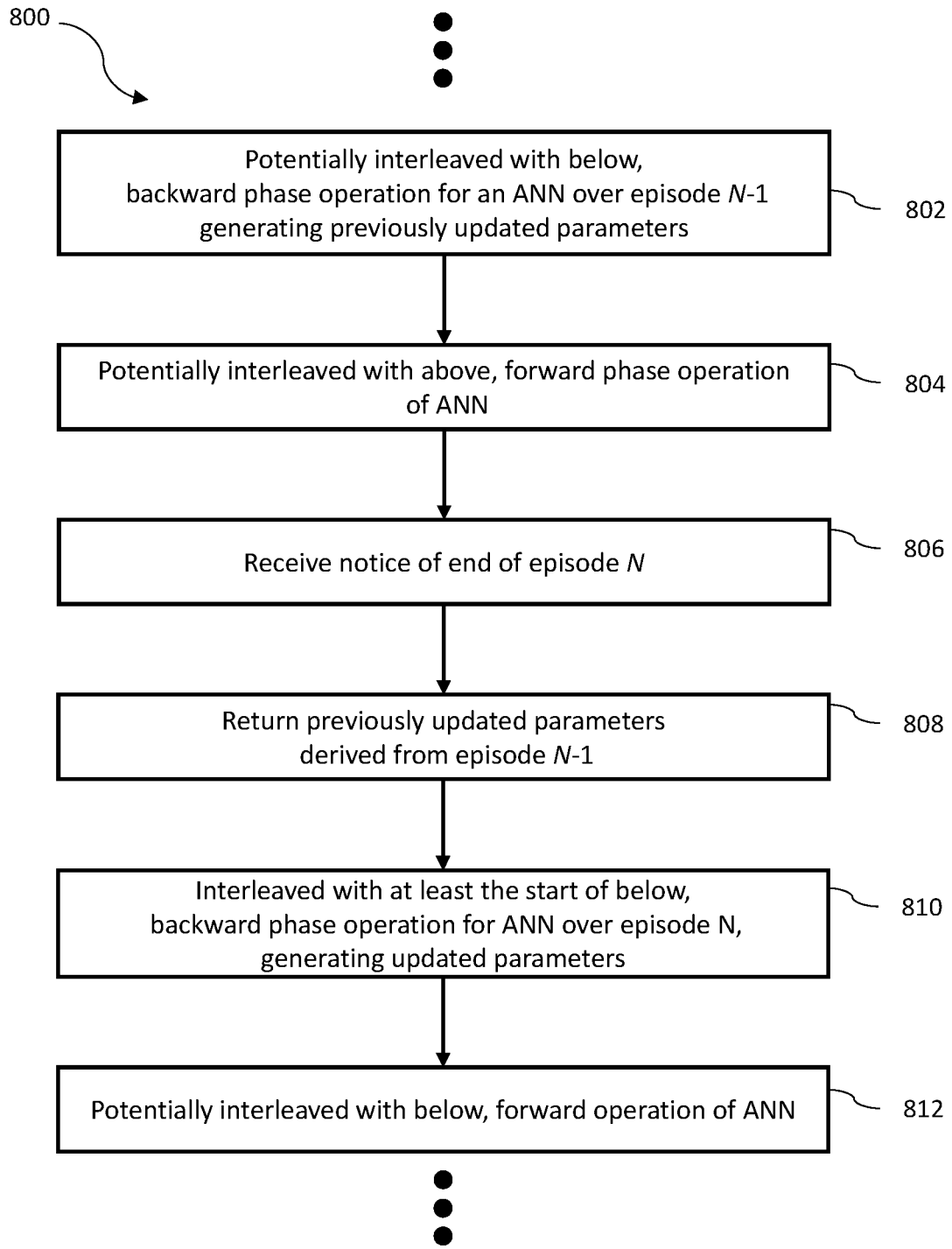
FIG. 8 is a flow-diagram of an implementation of an interleaved method of operation of an artificial neural network in accordance with the present systems, devices, articles, and methods.

FIG. 8 shows a method 800 including forward and backward phases interleaved together. Those of skill in the art will appreciate that other acts in method 800 may be included, some acts omitted, and/or acts performed in different orders to accommodate alternative implementations. The sequence in FIG. 8 is described as being performed by a controller, for example, robot 102 or computer 106, including a control subsystem or processor(s). However, the method 800 may be performed by another system, and/or by more than one computing system. As well, the method 800 can be performed off-line to train an ANN.

The method 800 begins at 802 or at a time prior to act 802. For example, method 800 may have begun many episodes previously to a present time. Method 800, which uses previous values, can be boot strapped from stored values in place of previous values.

At 802, the controller simulates the ANN in the backward direction. That is, the controller trains the ANN. The controller steps backward through time over a previous episode, e.g., N−1. In some implementation, the controller runs the recurrent neural network backward by unfolding the ANN over the previous episode. In some implementations, the controller determines new parameters, e.g., weights, for the ANN at each time step. In some implementations, the controller determines new parameters for the ANN at the "start" of the previous episode. That is, the end of the previous episode since act 802 runs in reverse over the episode. In some implementations, the controller calculates gradients for an objective function with respect to the parameters of the ANN. In some implementations, the controller uses the gradients to update the parameters using gradient descent including the versions of gradient descent described herein. In some implementations and examples of ANN and computing capacities, act 802 is interleaved with act 804, a forward phase.

At 804, the controller simulates an ANN in the forward direction. The controller calculates one or more sets of values for the variables present in the ANN. The controller uses parameters from an earlier time, such as, two episodes previously, i.e., N−2.

At 806, the controller receives information characterizing or representing notice of the end of a present episode, i.e., N. The information can be received from a central controller or another agent. In some implementations, the information characterizes or represents the time bounds on the episode, start time and end time. The end time need not be coterminous with the present time in act 806. That is, the forward operation can occur without knowledge of episode information. An example episode length is several seconds. In some implementations, time is discretized and an episode is a number of time steps.

At 808 the controller updates information characterizing or representing the previously updated parameters for the network. The previously updated parameters were created in act 802. That is, the controller makes available the weights for operations, e.g., running in forward direction. In some implementations, the controller returns the previously updated parameters. In some implementations, the controller distributes the previously updated parameters. This is a faster operation than generating the parameters. For example, a pointer update could effect a fast update of parameters.

At act 810, the controller simulates the ANN in the backward direction. The controller steps backward through time over the "present" episode, e.g., N. Act 810 is substantially the same in operation as act 802, but is executed for the just ended episode N. Act 810, as well, is interleaved with at least the start of act 812.

At act 812 the controller simulates the ANN in the forward direction. The controller simulates the ANN waiting for a notice indicating the end of the "next" episode, e.g., N+1. The variation stated in relation to act 804 are applicable here. Act 812 overlaps with act 810 for at least the start of act 812.

Method 800 continues until termination. The controller runs a backward phase, e.g. act 802, potentially interleaved forward phase, e.g. act 804, then at the end of an episode provides a parameter distribution, e.g., 808. The process continues with backward phase, e.g., act 810 or 802, potentially interleaved forward phase, e.g. act 812 or 804, then at the end of an episode, a parameter distribution, e.g., 808.

Figure 9:
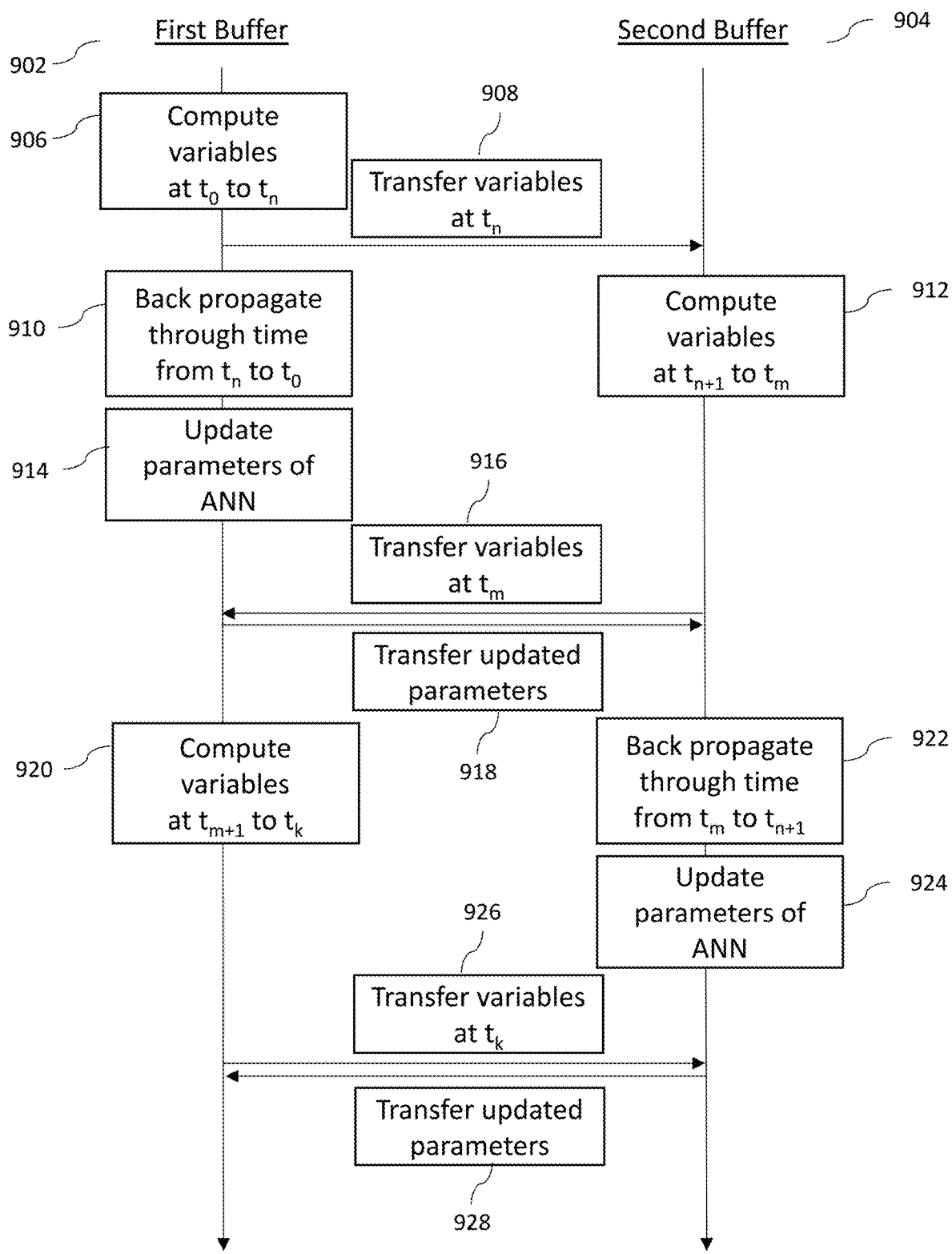
FIG. 9 is a flow-diagram of a method of operation of an agent in a distributed system in accordance with the present systems, devices, articles, and methods.

FIG. 9 shows a sequence diagram for a method 900 using two buffers. Those of skill in the art will appreciate that other acts may be included, some acts omitted, and/or acts performed in different orders to accommodate alternative implementations. The method 900 is described as being performed by a controller, for example, robot 102 or computer 106, including a control subsystem or processor(s). However, the sequence may be performed by another system. The exemplary sequence of operations shown includes two buffers at one host. A person of skill in the art will appreciate that two or more buffers can be used and/or buffers on other hosts.

The sequence of acts and interactions in method 900 involves a controller making use of a first buffer 902 and a second buffer 904. The buffers can be labeled left and right, up and down, strange and charm, and the like. The buffers can be on the same host or different hosts. Although two buffers are shown the method is extendable to more than two buffers.

At 906, the controller operates an ANN in the forward direction. The controller calculates values for the variables in the ANN. These values are determined for one or more time steps, e.g., $t_0$ to $t_n$, included in a first episode.

At the end of the first episode, the controller stores the current values for the variables in the ANN in the second buffer 904 at 908. In some implementations, the current values for the variables in the ANN are recorded as they are generated in act 906.

At 910, the controller determines gradients to an objective function for the ANN over the first episode. For example, the controller engages in back propagation through time over the first episode for the ANN in the first buffer. The first buffer includes the values for the variables of the ANN over the episode.

At 912, the controller simulates the ANN for a second episode and stores values for the variables in the second buffer 904. The second episode can be the same length or duration as the first episode or can be a different length or duration.

At 914, the controller updates the parameters of the ANN using the gradients determined in 910. The update can be by gradient descent, stochastic gradient descent, mini-batch gradient descent, or batch gradient descent. Generally, an update of parameters occurs faster than does a determining of gradients of a cost function with respect to the same parameters.

At 916, the controller optionally transfers the variables for the ANN at the end of the second episode from the second buffer to the first buffer. At 918, the controller transfers updated parameters for the ANN to the second buffer 904. The relative orders of operations 916 and 918 are arbitrary.

At 920 the controller operates the ANN in the forward direction. The controller calculates values for the variables in the ANN. These values are determined for a third episode.

At 922, the controller determines gradients to the objective function for the ANN over the second episode. For example, the controller engages in back propagation through time over the second episode for the ANN in the second buffer 904. The second buffer includes the values for the variables of the ANN over the episode.

At 924, the controller updates the parameters of the ANN using the gradients determined in 922.

At 926, the controller optionally transfers values for the variables for the ANN over the third episode to the second buffer. At 928, the controller transfers updated parameters for the ANN to the first buffer 902. The relative orders of operations 926 and 928 are arbitrary.

The process continues as needed with further episodes. In some embodiments, the only updates during the forward direction blocking operation is the parameter update, which takes little time. This allows, for example, the use of the forward direction to control a robot. Further, the transfer of updated parameters is event driven.

Figure 10:
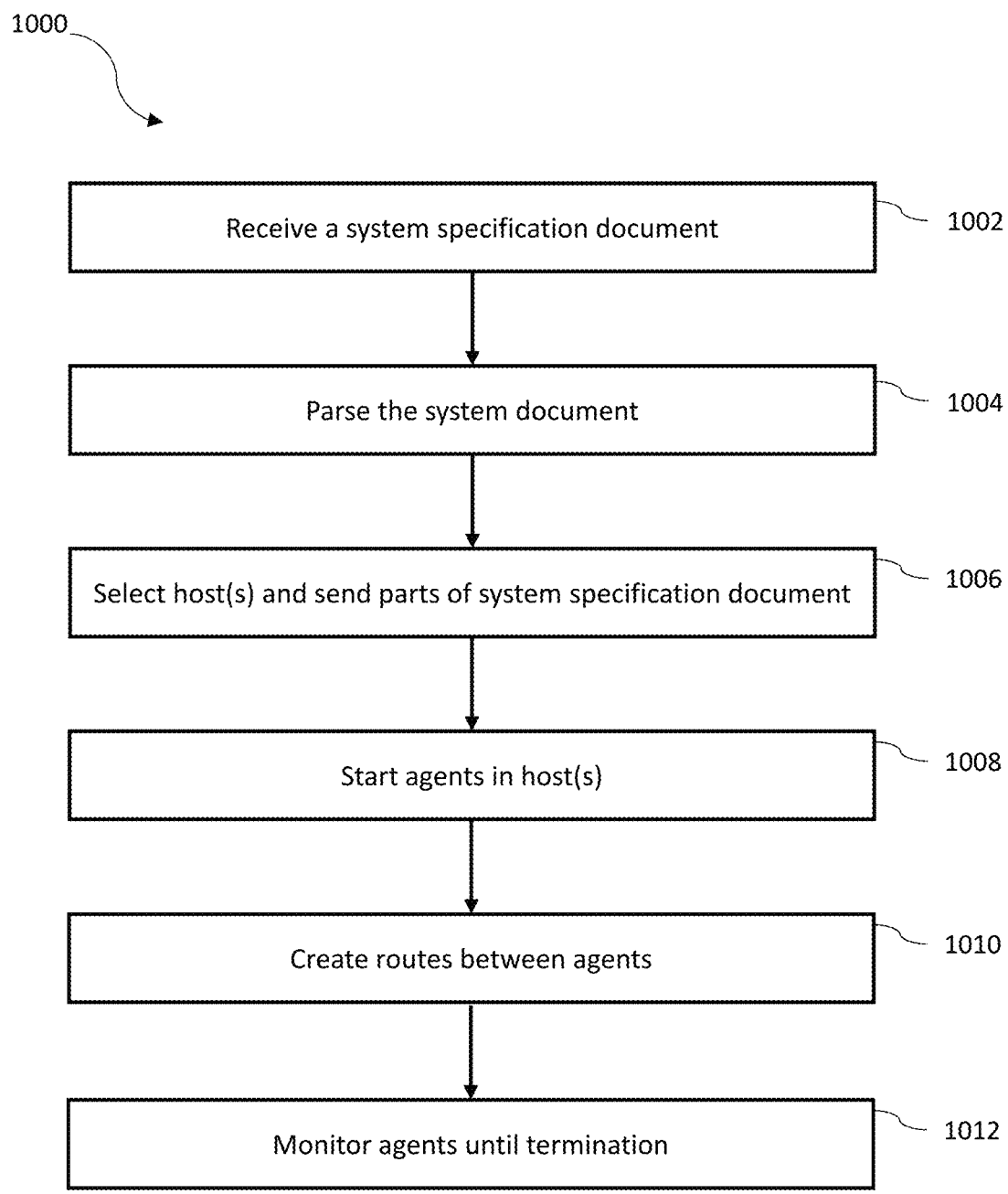
FIGS. 10-11 are a flow-diagrams of method of operation of a plurality of distributed agent in accordance with the present systems, devices, articles, and methods.

FIG. 10 illustrates a method 1000 of operation for a plurality of agents. Method 1000 implements techniques to establish and coordinate a plurality of agents over a plurality of hosts. Those of skill in the art will appreciate that other acts may be included, some acts omitted, and/or acts performed in different orders to accommodate alternative implementations. Method 1000 is described as being performed by a system controller, for example, robot 102 or computer 106, including a control subsystem or processor(s). However, method 1000 may be performed by another system. For example, method 1000 can be performed by in part by an on-board control subsystem (i.e., on board the robot) 203 in conjunction or cooperation with an off-board control system (i.e., external or distinctly physically separate from the robot, with or without human interaction, intervention or control).

Method 1000 begins by an invocation by the system controller. At 1002, the system controller receives a system specification document. The system specification document includes information characterizing, representing, or specifying the components within a distributed application. The system specification document may be in one or more semi-structured (i.e., self-describing), or structured formats including JSON, XML, and binary. At 1004, the system controller parses the system specification document. Parsing identifies information that characterizes or represents a plurality of agents in a system and one or more routes (e.g., communications paths) between agents.

The system controller, at 1006, selects one or more hosts to run the plurality of agents. A host is a tangible or virtual computer. Examples of a tangible computer include robot 200, robot 300, or computer system 400. An agent is processor executable-instructions and processor-readable data. Agents are part of the system and may be specified in the system specification document or pre-existing, e.g., distributed in a library, or loaded on to a host.

At 1008, the system controller starts one or more agents. In some implementations, the system controller sends information to one or more hosts, the information specifying one or more requests to start a plurality of agents. For example, the system controller requests a host to start one or more agents associated with the host. In some implementations, the system controller requests each previously selected host start one or more agents. A description of a method for a host to start and run of an agent is found herein at least in relation to FIG. 12. In some implementations, the agents actively report to the system controller the agents have started. In some implementations, the agents passively report to the system controller that the agents started. An example of passive reporting is updating a data structure.

At 1008, the system controller sends one or more hosts suitable parts of the system specification document. The suitable parts of the document include information specifying, for example, the trigger expression and the body expression.

At 1010, the system controller creates one or more routes between agents. That is, the system controller establishes or causes to be established communication links between the agents on the various hosts in the system.

At 1012, the system controller monitors the behavior of the agents and/or one or more routes. The monitoring continues until termination, e.g., a termination request for the system arrives. The system may process the termination by the process described in relation to FIG. 11.

Figure 11:
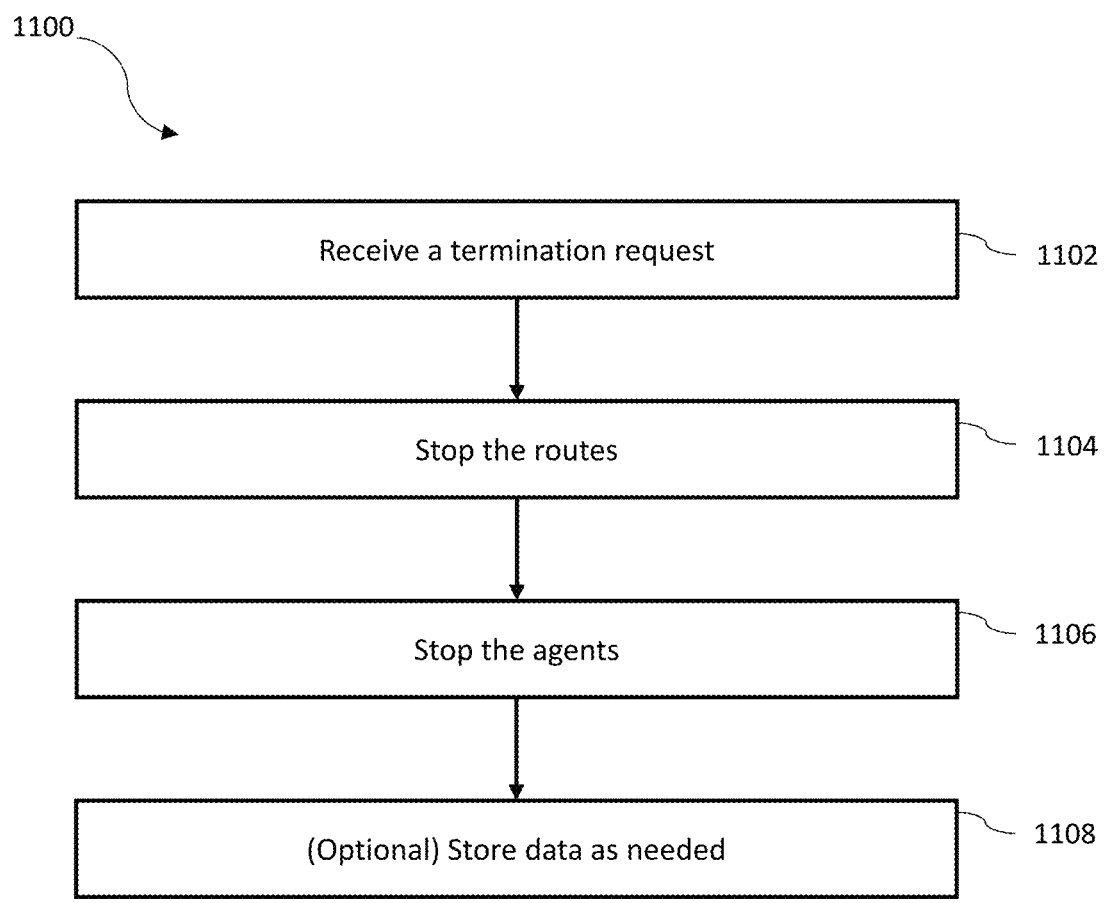

FIG. 11 is a flow-diagram showing an implementation of a method 1100 to terminate the operation of distributed agents. Those of skill in the art will appreciate that other acts may be included, some acts omitted, and/or acts performed in different orders to accommodate alternative implementations. Method 1100 is described as being performed by a system controller, for example, robot 102 or computer 106, including a control subsystem or processor(s). However, method 1100 may be performed by another system. For example, method 1100 can be performed by in part by an on-board control subsystem (i.e., on board the robot) 203 in conjunction or cooperation with an off-board control system (i.e., external or distinctly physically separate from the robot, with or without human interaction, intervention or control).

Method 1100 begins at 1102 with the system controller receiving a termination request for one or more agents in a system. The termination request includes information specifying one or more agents in the system. In some examples, the termination request specifies all agents in the system. At 1104, the system controller stops the routes to and from the specified agents. At 1106, the system controller stops the specified agents. Optionally at 1108, the system controller stores the states of the specified agents as needed. That is, the system controller directs the hosts to store the state of the specified agents, or system controller stores the state of the agents.

Figure 12:
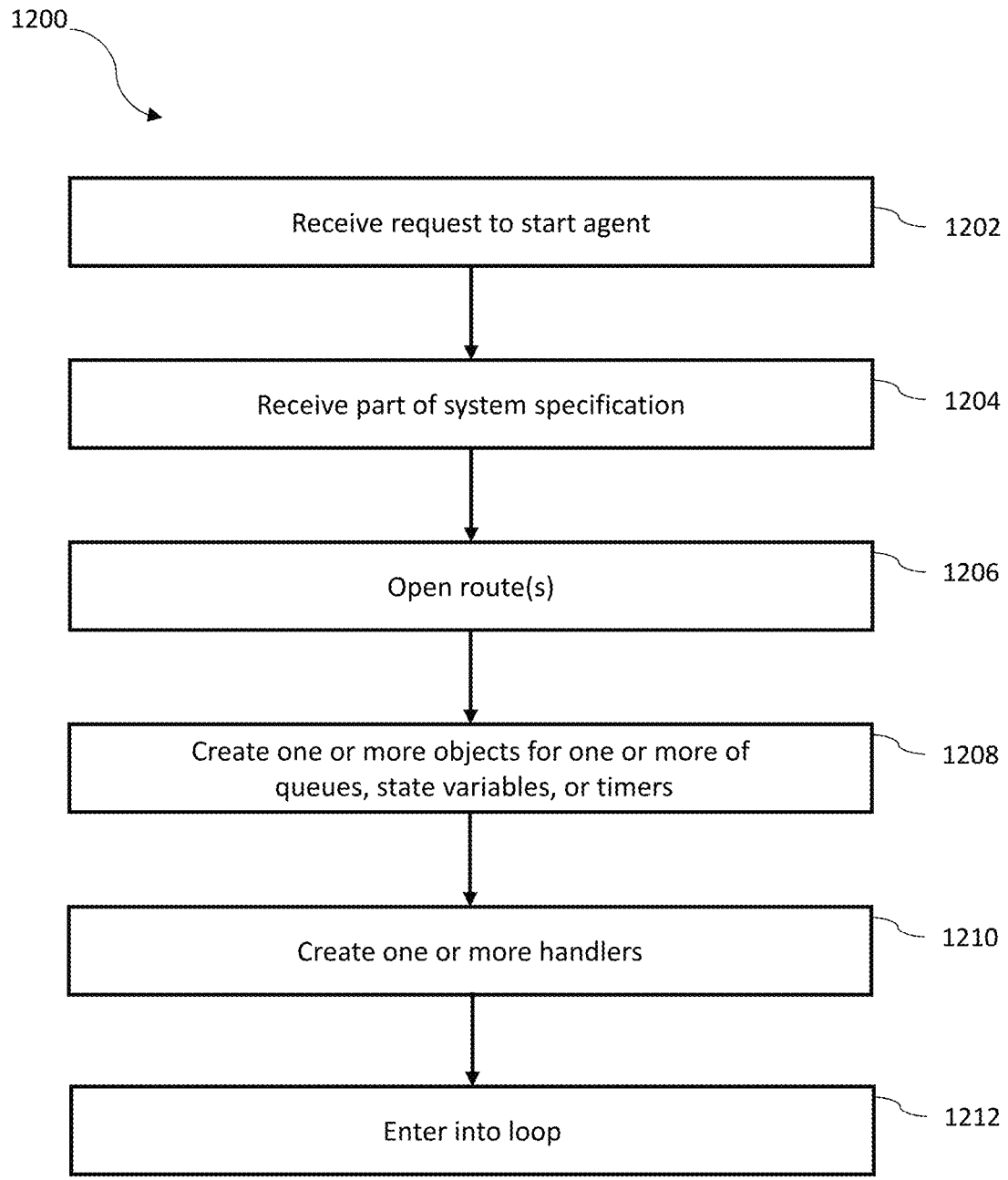
FIGS. 12-13 are a flow-diagrams of methods of operation for an agent in accordance with the present systems, devices, articles, and methods.

FIG. 12 is a flow-diagram of a method 1200 of operation for an agent in a distributed system. The method includes a plurality of acts. Those of skill in the art will appreciate that other acts may be included, some acts omitted, and/or acts performed in different orders to accommodate alternative implementations. Method 1200 is described as being performed by a host, for example, robot 102 or computer 106, including a control subsystem or processor(s). However, method 1200 may be performed by another system. For example, method 1200 can be performed by in part by an on-board control subsystem (i.e., on board the robot) 203 in conjunction or cooperation with an off-board control system (i.e., external or distinctly physically separate from the robot, with or without human interaction, intervention or control). The description of method 1200 includes setting up one agent, but the process is an applicable to a plurality of agents.

Method 1200 begins at 1202 with the host receiving a request to start an agent. At 1204, the host receives a part of a system specification document. The part of the system specification includes information defining the agent and one or more associated routes. In various implementations, routes are set up before agents. In some implementations, the host optimizes the part of the system specification.

In some implementations, an ANN comprises agents. An agent comprises various components including input interfaces, output interfaces (e.g., queue objects), storage spaces for maintaining an internal state (e.g., state object), and processor-executable instructions defining executable computational logic (e.g., handler objects). In some implementations, an application comprises agents.

At 1206, the host opens up the one or more routes. In some implementations, the host establishes or causes to be established communication between itself and another host. In some implementations, the host establishes or causes to be established communication between a first and a second agent. For example between an agent defined in the part of the system specification and a remote agent.

At 1208, the host creates one or more objects for one or more of queues, state variables, or timers, as defined for the agent. Each queue is associated with a route into or out of the agent. The queue couples the state variables to the route. The state variables are internal variables to the agent. The timers are used to execute processor-readable instructions in the agent in the absence of an incoming message on a route or an addition a queue. A timer allows agents to run processor-executable instructions on a scheduled basis.

At 1210, the host creates handlers, or handler objects, according to the system specification document. A handler may consume the content of a queue, perform some processing, update one or more states, and/or extend another queue. In some implementations, the handler includes a trigger expression and a body expression. An expression is a section of processor-executable instructions. A trigger expression defines or specifies when a processor or other circuitry should execute a body expression. The body expression contains processor-executable instructions defining the function of the agent. For example, processor-executable instructions to consume the content of a queue, perform some processing, update one or more states, and/or extend another queue.

At 1212, the host places itself in a loop. The host loops over all the agents it has defined, e.g., states within the agents, and trigger expressions. The host loops over all the routes moving data. The host tests for termination of one or more agents. This loop is described herein at least in relation to FIG. 13.

Figure 13:
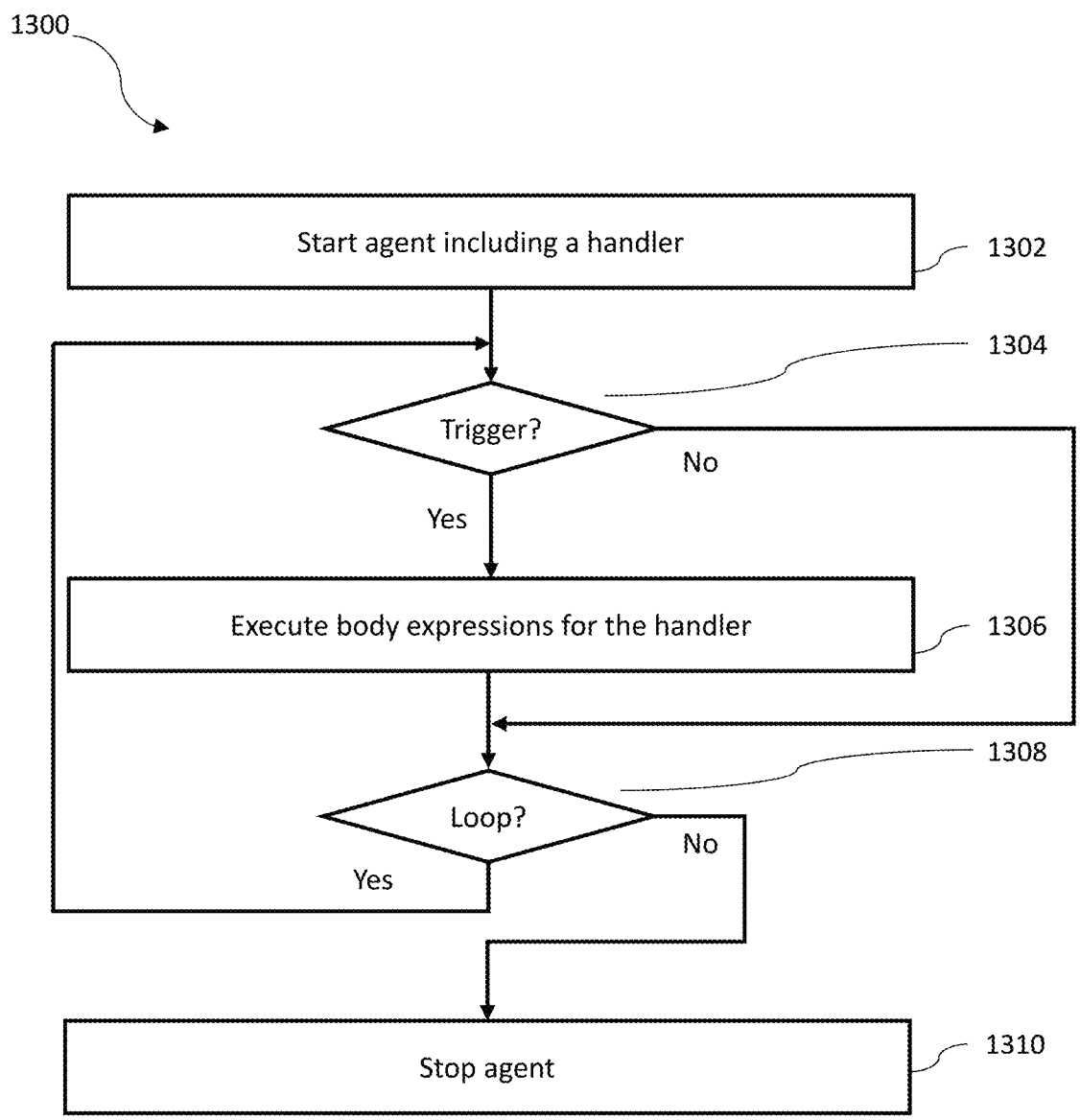

FIG. 13 is illustrates an example of a method 1300 of operation for a distributed agent. The method includes a plurality of acts. Those of skill in the art will appreciate that other acts may be included, some acts omitted, and/or some acts performed in different orders to accommodate alternative implementations. Method 1300 is described as being performed by a host, for example, robot 102 or computer 106, including a control subsystem or processor(s). However, method 1300 may be performed by another system.

Method 1300 implements techniques to operate an agent. Method 1300 begins by an invocation by the host. At 1302, the host starts the agent. The host executes processor-executable instructions to start the operation of one or more components. The controller maintains the input interface and the output interface for the component.

At 1304, the host executes the trigger expression. The host compares or tests for the presence of a trigger condition or activation condition. Examples of a trigger condition include an event, a time, and functions based on event or time. For example, is the current time as provided by a timer object equal or more than a predetermined threshold value. Also for example, the host determines if there is information characterizing or representing occurrence of an event in a physical environment, within the system, or within the host. If there is a trigger condition (i.e., 1304—Yes), control passes to 1306. If there is no trigger condition (i.e., 1304—No), control passes to 1308.

At 1306, the host executes the processor-executable instructions that define computational logic for the component. That is, the host executes the body expression. Examples of logic within a body expression include compute a sine wave, compare a set of predicted values to a set of target values, and compute an activation function on a weighted summation of values.

At 1308, the host tests for the presence of a loop termination condition. If the loop is to continue (i.e., 1108—Yes), control passes to act 1304. A delay (not shown) can occur before the controller executes instructions that define act 1304. If a termination condition is present and the loop is to end (i.e., 1308—No), control passes to act 1310. At act 1310, the host stops the agent. An example of stopping an agent is described herein at least in relation to FIG. 11.

Figure 14:
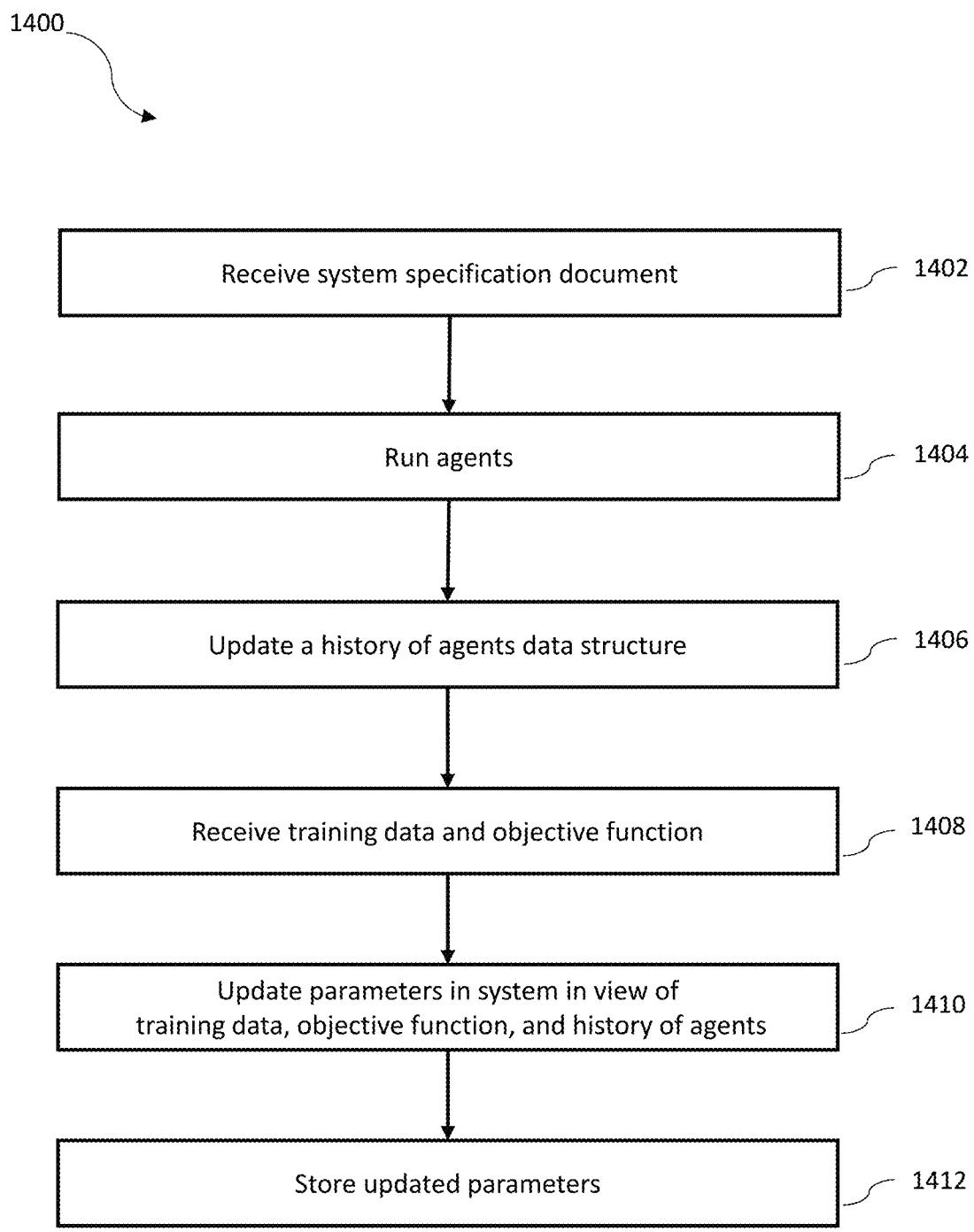
FIG. 14 is a flow-diagram of method of operation of an application including two or more agents in accordance with the present systems, devices, articles, and methods.

FIG. 14 is a flow-diagram of a method 1400 of operation a distributed system running an application including two more agents. The method 1400 includes a plurality of acts. Those of skill in the art will appreciate that other acts may be included, some acts omitted, and/or some acts performed in different orders to accommodate alternative implementations. Method 1300 is described as being performed by a host, for example, robot 102 or computer 106, including a control subsystem or processor(s). However, method 1400 may be performed by another system. For example, method 1400 can be performed by in part by a system like system 400 or a control system like subsystem 203.

Method 1400 is suitable for an event driven application. In an event driven application, the instance of the ANN varies between executions. To run an ANN in the backward direction a record of a cascade of agents is needed. In distributed system, there may be no storage space to share information characterizing or representing the cascade of agents. Thus, method 1400 can be used to recover information characterizing or representing the cascade of agents.

Method 1400 is suitable for an application in a system without a correctness guarantee. Method 1400 is suitable for a system with a latency guarantee (e.g., maximum latency guarantee that system latency will not exceed a defined amount). The present disclosure includes descriptions of an ANN operating with a maximum latency guarantee for communication on the edges in the ANN. Communication can either operate with correctness guarantees or maximum latency guarantees, and not both. Artificial neural networks are designed for correctness guarantees. That is, ANN are assumed to operate, as far as Applicants are aware, with faultless edges. Some ANN use dropout techniques to purposely and selectively remove edges, but this is done in training. Whereas real-time control requires processor-executable instructions designed for latency guarantees. That is a message will arrive with a certain latency or it can be assumed that the message will never arrive.

Method 1400 begins at 1402 with the host receiving a part of a system specification document. The part of the system specification includes information defining the agent and one or more associated routes. At 1404, the controller starts two or more agents. The creation and running of agents is described herein.

In various implementations, the agents communicate with each other in an event driven way. That is a trigger condition is based on an event rather than a timer. Each agent includes a set of local connections for the agent. These connections are found in information specifying the routes between agents and when the routes are used.

In various implementations, the agents communicate with each other with communication delayed due to latency. That is, a trigger is delayed because a message is late, but does arrive. The connections between agents (i.e., routes) include a temporal component, i.e., when a route is used, that varies with example agents, routes, activation conditions, and computing resources. Again each agent includes a set of local connections for the agent. These connections are found in information specifying the routes between agents and when the routes are used (i.e., under which specific conditions a particular route is to be used).

At 1406, the host updates a data structure that tracks a history of agents. In some implementations, the data structure is a directed acyclic graph. The nodes represent agents or times the agents are executed. That is, each agent has a temporally ordered set of local connections.

At 1408, the host receives training data and an objective function. The objective function may operate on predicted and actual output values. The objective function, can have as an operand or input parameters of an ANN.

At 1410, the host updates parameters associated with agents in view of the training data, the objective function, and the history of agents. For example, the host treats the history of agents as an ANN and optimizes the objection function by varying parameter in the agents.

At 1412, the host stores or returns the parameters associated with agents.

In some implementations, an agent is implemented using a decorator design pattern. A decorator pattern is used to enhance or modify objects for a particular purpose. An object the agent can include may take the form of base functionality, like decrementing queues or changing state. The trigger and body expressions can be implemented as a decorator on top of the agent object.

Figure 15:
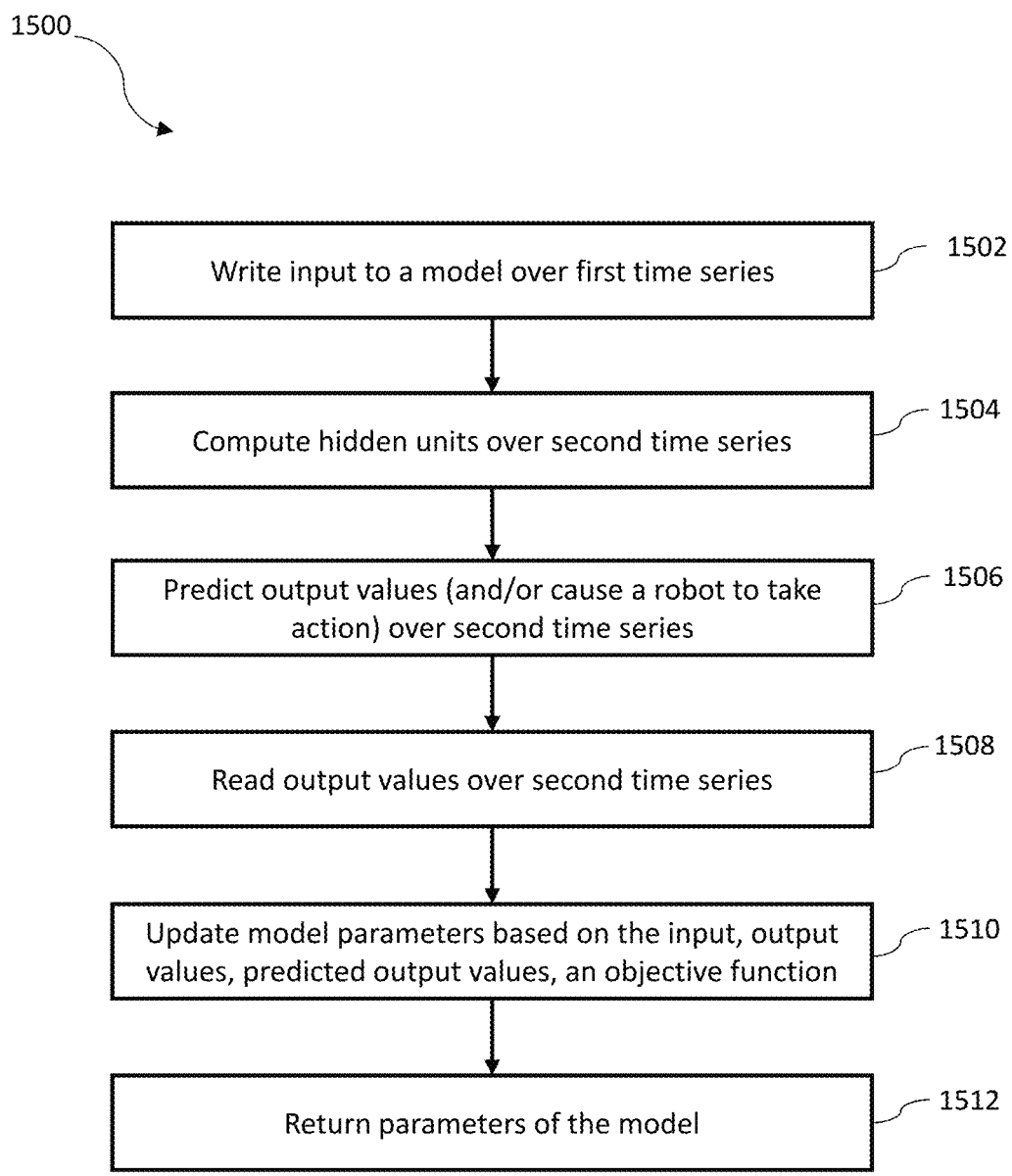
FIG. 15 is a flow-diagram of method of operation for system identification in accordance with the present systems, devices, articles, and methods.

FIG. 15 is a flow-diagram showing an implementation of a method 1500 for system identification. Those of skill in the art will appreciate that other acts may be included, some acts omitted, and/or acts performed in different orders to accommodate alternative implementations. Method 1500 is described as being performed by a host, for example, robot 102 or computer 106, system 400, including a control subsystem or processor(s). However, method 1500 may be performed by another system.

In some embodiments, the host includes processor-executable instructions that define at least two agents. A first agent is a write agent that writes input to a model when the trigger condition is satisfied. The model's output is a representation of a tangible system in an environment, for example, robot 102-1 in environment 140-1. For example, the model's output includes instructions to position the robot or its end-effector in the environment according to the output. A second agent is a read agent that receives data form a sensor characterizing or representing a state of a tangible system. For example, the data can characterize or represent the position of a robot or end-effector. Reading is an acquisition of potentially noisy information that characterizes or represents a state of a robot. Write is an operation to effect, as in cause, a state. In some implementations, the model is an artificial neural network. The agents can call a third agent that evolves the state the model.

The agents execute when their respective triggers are satisfied. For example, the first agent executes with a first frequency and the second agent executes with a second frequency. For example, a write agent writes every 20 milliseconds and a read agent reads every 5 milliseconds. In some implementations, the frequency is implemented by a timer within an agent. In some implementations, the first agent or the second agent executes in an event driven way. Thus, while the term frequency is used, operation in at least some instances can be aperiodic.

At 1502, the host's read agent writes input to a model. In some implementations, the host writes input per a first time series. For example, following a sequence of events or at a first frequency. At 1504, when the model is an artificial neural networks with hidden units, the host determines the value of the hidden units in view of the input.

At 1506, the host predicts the output of the model for each write operation. The output can be generated in an event driven way with new input. In some implementations, the host causes the robot to take an action, e.g., move.

At 1508, the host reads actual or true output values. In some implementations, the host does this according to a second time series. For example, at a second frequency. In some implementations, the reading of true output values occurs at about the same time the host predicts the output of the model. Here "about" is used in the sense of differing by much less than the period of the faster of the first or second frequency, or average frequency of the first or second time series. For example, "about" is used in the sense of differing by less than or equal to ten percent of the period of the faster of the first or second frequency.

At 1510, the host trains the model in view of the input, output, predicted output, and an error function. An example of incremental errors is the difference between output given input and the predicted output. For example, the host minimizes an objective function with respect to parameter of the mode. That is, vary parameters in the model to minimize the difference between output, and predicted output as measured by the objective function. The host then updates the parameters for the model.

At 1512, the host returns or stores information characterizing or representing the updated parameters. The information can be used to identify the system. That is, an agent such as a user at an operation interface like interface 104, will know given the inputs what the system will output. For example, the parameters could specify how a servo-motor will respond to a signal containing desired positions.

FIG. 16A is a flow-diagram showing an implementation of a method 1600 for creating a predict model. Those of skill in the art will appreciate that other acts may be included, some acts omitted, and/or some acts performed in different orders to accommodate alternative implementations. Method 1600 is described as being performed by a host, for example, robot 102 or computer 106, system 400, including a control subsystem or processor(s). However, method 1600 may be performed by another system.

In some embodiments, the host includes processor-executable instructions and/or data that define at least two agents. A first agent is a write agent that writes input to a model when the trigger condition is satisfied. A second agent is a read agent that reads the output of a model. The agents can call a third agent that evolves the state the model. For example, the third agent includes a handler to, when requested (i.e., per a trigger condition), propagate values within an artificial neural network, i.e., body expression.

At 1602, the host's write agent writes input to a model over a first time series. For example, write at a first frequency. When the model is an artificial neural network with hidden units, at 1604 the host determines the values for the hidden units in view of the input. In some implementations, the host calculates the value of the hidden units until the end of the first time series.

At 1606, the host produces the output of the model. In some implementations, the host produces output for each execution of the write processor-executable instructions and thus the values of the hidden units. In some implementations, the host can produce output over a second time series. In some embodiments, the host produces the output by causing a robot to take action. For example, where the robot's state is a linear transform of the hidden units, the host produces the output by updating the hidden units. In some embodiments, the host produces the output by predicting output of the model.

At 1608, the host reads the output values. In some implementations, this is done over the second time series. In some implementations, the host reads the output values in an event driven way. In some implementations, the reading of target output values occurs at about the same time as the production of the output of the model. About is used here in the sense of approximately equal to, for example, within ten percent.

At 1610, the host evaluates an objective function with arguments drawn from the target output values and the output value over the first period. The objective function expresses how close the input achieved the target output given the parameters of the model.

At 1612, the host varies the input to optimize the objective function. For example, the host finds the input that brings the robot to the target state. Thus, method 1600 can be repeated for different target outputs.

The host may return or store information characterizing or representing the updated inputs. The information can be used as a predictive model for the system. That is, based on a knowledge of what input to the system attains a target position, a trained system model, could provide good guesses or approximations to future output values given a variety of input values.

FIG. 16B is a flow-diagram showing a worked example 1650 of method 1600 of FIG. 16A. At 1652, at time t the host writes input to a model and computes the value of the hidden units within the model. At 1654, at time t plus an increment, the input to the model remains unchanged and the read agent reads the output, $o_T$. The host computes the value of the hidden units, h; predicted output, o; and, in some implementations, the value of the objective function, Obj. In some implementations, the evaluation of the objective function is batched.

At 1656, at time t plus two increments, the input to the model remains and the read agent reads the output, $o_T$. The host computes the value of the hidden units, h; predicted output, o; and, in some implementations, the value of the objective function, Obj.

This incrementally repeats at 1658 and 1660. Then at 1662, the host records the input that minimizes the objective function. The input is associated with a target values for the output. The evaluation of the objective function can occur at 1662.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or virtually any combination thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure. For example, those skilled in the relevant art can readily create source based on the flowcharts of the figures herein, including FIGS. 5, and 7-16, and the detailed description provided herein.

As used herein processor-executable instructions and/or data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary or desirable, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. Provisional Application No. 62/255,899, filed Nov. 16, 2015 are incorporated herein by reference, in their entirety.

The invention claimed is:

1. A method of operation of an artificial neural network, including a plurality of variables, the plurality of variables representing a state of one or more units of the artificial neural network, a plurality of parameters, the plurality of parameters representing weights of the one or more units and edges connecting the units, and a plurality of buffers including a first buffer and a second buffer, the buffers each storing and updating a respective collection of values for the plurality of variables and the plurality of parameters, the method comprising:

computing, over a first period, by at least one hardware processor and using the first buffer, a first plurality of values for the plurality of variables based, at least in part, on a first plurality of values for the plurality of parameters;

transferring, to the second buffer, by the at least one hardware processor, current values for the plurality of variables at the end of the first period that have been computed by the at least one hardware processor and using the first buffer;

calculating, over a second period, by the at least one hardware processor and using the first buffer, a first plurality of incremental errors for the artificial neural network that occurred over the first period;

generating, by the at least one hardware processor, a second plurality of values for the plurality of parameters based, at least in part, on the first plurality of incremental errors;

storing in the first buffer, by the at least one hardware processor, the second plurality of values for the plurality of parameters;

interleaved with the calculating of the first plurality of incremental errors using the first buffer over the second period, computing, over a third period, by the at least one hardware processor and using the second buffer, a second plurality of values for the plurality of variables based, at least in part, on (a) the stored current values for the plurality of variables at the end of the first period and (b) the first plurality of values for the plurality of parameters, wherein the second period at least partially overlaps with the third period;

transferring, to the first buffer, by the at least one hardware processor, current values for the plurality of variables at the end of the third period that have been computed by the at least one hardware processor and using the second buffer; and returning, by the at least one hardware processor, the second plurality of values for the plurality of parameters.

2. The method of claim 1, further comprising:

computing, by the at least one hardware processor, over a fourth period, a third plurality of values for the plurality of variables in the artificial neural network based, at least in part, on the second plurality of values for the plurality of parameters;

calculating, by the at least one hardware processor, over a fifth period, a second plurality of incremental errors for the artificial neural network that occurred over the fourth period;

generating, by the at least one hardware processor, a third plurality of values for the plurality of parameters; and interleaved with calculating the second plurality of incremental errors for the artificial neural network, computing, by the at least one hardware processor, over a sixth period, a fourth plurality of values for the plurality of variables for the artificial neural network based, at least in part, on the second plurality of values for the plurality of parameters, wherein the fifth period at least partially overlaps with the sixth period.

3. The method of claim 1, further comprising:

storing, by the at least one hardware processor, the first plurality of values for the plurality of variables for the artificial neural network.

4. The method of claim 1 wherein the artificial neural network is associated with an objective function, the method further comprising:

computing, by the at least one hardware processor, a gradient for the objective function with respect to the plurality of parameters; and performing, by the at least one hardware processor, gradient descent with the gradient to create the second plurality of values for the plurality of parameters.

5. The method of claim 4 wherein computing the gradient for the objective function with respect to the parameters comprises:

unfolding, by the at least one hardware processor, the artificial neural network over a duration less than or equal to the first period; and performing, by the at least one hardware processor, backpropagation through time on the unfolded artificial neural network.

6. The method of claim 1, further comprising:

receiving, by the at least one hardware processor, a plurality of input values for the artificial neural network.

7. The method of claim 1, further comprising:

producing, by the at least one hardware processor, a plurality of output values for the artificial neural network; and causing, by the at least one hardware processor, a robot to move based on the plurality of output values.

8. The method of claim 1, further comprising:

computing, by the at least one hardware processor for another artificial neural network that includes another plurality of variables and another plurality of parameters, a first plurality of values for the other plurality of variables of the other artificial neural network based on a first plurality of values for the other plurality of parameters;

running, by the at least one hardware processor, the other artificial neural network backward over the first period;

generating, by the at least one hardware processor, a second plurality of values for the other plurality of parameters; and interleaved with computing, for the other artificial neural the first plurality of values for the other plurality of variables of the other artificial neural network, computing, by the at least one hardware processor, a second plurality of values for the other plurality of variables for the other artificial neural network over the third period.

9. The method of claim 1 wherein behaviors of the artificial neural network are described by a system of differential equations, the method further comprising:

numerically integrating, by the at least one hardware processor, the system of differential equations.

10. The method of claim 1 wherein generating the second plurality of values for the plurality of parameters comprises:

identifying, by the at least one hardware processor, a system model for a robot; and returning, by the at least one hardware processor, a system model for the robot.

11. A system, comprising:

at least one processor;

at least one non-transitory computer-readable storage media communicatively coupled to the at least one processor, and which stores at least one of processor-executable instructions or data thereon which when executed causes the at least one processor to:

initialize implementation of an artificial neural network including a plurality of parameters and a plurality of variables;

compute, over a first period, a first plurality of values for the plurality of variables based, at least in part, on a first plurality of values for the plurality of parameters;

store current values for the plurality of variables at the end of the first period in a second buffer;

calculate, over a second period, by using a first buffer, a first plurality of incremental errors for the artificial neural network that occurred over the first period;

generate a second plurality of values for the plurality of parameters based, at least in part, on the first plurality of incremental errors for the artificial neural network;

store the second plurality of values for the plurality of parameters in the first buffer;

interleaved with the calculation of the first plurality of incremental errors for the artificial neural network, compute, over a third period, by using the second buffer, a second plurality of values for the plurality of variables based, at least in part, on (a) the stored current values for the plurality of variables at the end of the first period and (b) the first plurality of values for the plurality of parameters, wherein the second period at least partially overlaps with the third period;

store current values for the plurality of variables at the end of the third period that have been computed by using the second buffer to the first buffer; and return the second plurality of values for the plurality of parameters.

12. The system of claim 11 wherein, when executed, the processor-executable instructions further cause the at least one processor to:

compute, over a fourth period, a third plurality of values for the plurality of variables based, at least in part, on the second plurality of values for the plurality of parameters;

calculate, over a fifth period, a second plurality of incremental errors for the artificial neural network that occurred over the fourth period;

generate a third plurality of values for the plurality of parameters; and interleaved with the calculation of the second plurality of incremental errors for the artificial neural network, compute, over a sixth period, a fourth plurality of values for the plurality of variables based, at least in part, on the second plurality of values for the plurality of parameters, wherein the fifth period at least partially overlaps with the sixth period.

13. The system of claim 11 wherein the artificial neural network is associated with an objective function, and when executed, the processor-executable instructions further cause the at least one processor to:

compute a gradient for the objective function with respect to the plurality of parameters; and perform gradient descent with the gradient creating the second plurality of values for the plurality of parameters.

14. The system of claim 13 wherein, when executed, the processor-executable instructions further cause the at least one processor to:

unfold the artificial neural network over a duration less than or equal to the first period creating an unfolded artificial neural network; and perform backpropagation through time on the unfolded artificial neural network.

15. The system of claim 11, further comprising:

a sensor subsystem coupled to the at least one processor; and where, when executed, the processor-executable instructions further cause the at least one processor to:

receive a plurality of input values for the artificial neural network from the sensor subsystem.

16. The system of claim 11, further comprising:

a robot coupled to the at least one processor; and where, when executed, the processor-executable instructions further cause the at least one processor to:

produce a plurality of output values for the artificial neural network; and cause the robot to move based on the plurality of output values.

17. The system of claim 11, further comprising:

a network interface subsystem coupled to the at least one processor; and where, when executed, the processor-executable instructions further cause the at least one processor to:

send to at least one external system, via the network interface subsystem, the plurality of variables of the artificial neural network; and send to at least one external system, via the network interface subsystem, the plurality of parameters of the artificial neural network.

18. The system of claim 11, further comprising:

a network interface subsystem coupled to the at least one processor; and where, when executed, the processor-executable instructions further cause the at least one processor to:

receive the plurality of variables of the artificial neural network; and receive the plurality of parameters of the artificial neural network.

* * * * *